(12) United States Patent
Mirzavand Boroujeni et al.

(10) Patent No.: US 11,238,725 B2
(45) Date of Patent: Feb. 1, 2022

(54) APPARATUS AND METHODS FOR WIRELESS/RFID SENSORS

(71) Applicant: THE GOVERNORS OF THE UNIVERSITY OF ALBERTA, Edmonton (CA)

(72) Inventors: Rashid Mirzavand Boroujeni, Edmonton (CA); Mohammad Mahdi Honari Kalateh, Edmonton (CA); Seyed Pedram Mousavi Bafrooei, Edmonton (CA)

(73) Assignee: THE GOVERNORS OF THE UNIVERSITY OF ALBERTA, Edmonton (CA)

(*) Notice: Subject to any disclaimer, the term of this patent is extended or adjusted under 35 U.S.C. 154(b) by 120 days.

(21) Appl. No.: 16/494,145

(22) PCT Filed: Mar. 14, 2018

(86) PCT No.: PCT/CA2018/050306
§ 371 (c)(1),
(2) Date: Sep. 13, 2019

(87) PCT Pub. No.: WO2018/165755
PCT Pub. Date: Sep. 20, 2018

(65) Prior Publication Data
US 2020/0074844 A1    Mar. 5, 2020

Related U.S. Application Data

(60) Provisional application No. 62/472,111, filed on Mar. 16, 2017.

(51) Int. Cl.
*G08C 17/02* (2006.01)
*H04Q 9/00* (2006.01)

(52) U.S. Cl.
CPC ............. *G08C 17/02* (2013.01); *H04Q 9/00* (2013.01); *H04Q 2209/47* (2013.01); *H04Q 2209/886* (2013.01)

(58) Field of Classification Search
CPC ...... G08C 17/02; H04Q 9/00; H04Q 2209/40; H04Q 2209/47; H04Q 2209/886; G01D 21/02

(Continued)

(56) References Cited

U.S. PATENT DOCUMENTS 4,138,678 A * 2/1979 Kirner .................. G01S 1/022
                                                                342/169
6,707,338 B2 * 3/2004 Kenington ............ H03F 1/3247
                                                                330/10

(Continued)

FOREIGN PATENT DOCUMENTS

EP         2662984 A1 * 11/2013 ............ H03M 1/80

OTHER PUBLICATIONS

International Preliminary Report on Patentability dated Sep. 26, 2019 from PCT/CA2018/050306, 6 pgs.

(Continued)

*Primary Examiner* — Yong Hang Jiang
(74) *Attorney, Agent, or Firm* — Jenna L. Wilson; Wilson Lue LLP

(57) ABSTRACT

A wireless sensor is provided for use in near-to-zero or zero-power consumption applications. The sensor includes a sensing circuit, a modulator connected to the sensing circuit and configured to modulate an input signal using variations in input impedance produced by the sensing circuit to produce a modulated output signal, and a transmitting element such as an antenna to transmit the modulated output signal to a receiver. In some implementations, the sensor includes a pilot sequence generator that may be powered by (Continued)

a received signal from a transmitting node. The input signal is thus modulated by both pilot data and the input impedance. The input signal may be received from the transmitting node. Alternatively, a power source may be provided in the wireless sensor for generating the input signal and/or pilot data.

15 Claims, 18 Drawing Sheets

(58) Field of Classification Search
USPC .................................................. 340/12.51
See application file for complete search history.

(56) References Cited

U.S. PATENT DOCUMENTS

| | | | |
|---|---|---|---|
| 6,867,686 B1* | 3/2005 | Emmerling | B60R 25/24 340/10.2 |
| 7,103,328 B2 | 9/2006 | Zelley | |
| 2007/0046369 A1 | 3/2007 | Schober et al. | |
| 2009/0215423 A1* | 8/2009 | Hwang | H03B 5/1253 455/334 |
| 2011/0176462 A1* | 7/2011 | Kim | H01Q 3/26 370/281 |
| 2012/0068827 A1 | 3/2012 | Yi et al. | |
| 2017/0353248 A1* | 12/2017 | Booman | G01R 31/308 |

OTHER PUBLICATIONS

International Search Report dated Jun. 22, 2018 from PCT/CA2018/050306, 3 pgs.

* cited by examiner (a)

(b)

(a)

(b)

APPARATUS AND METHODS FOR WIRELESS/RFID SENSORS

CROSS-REFERENCE TO RELATED APPLICATIONS

This application claims priority to U.S. Provisional Application No. 62/472,111, filed Mar. 16, 2017, the entirety of which is incorporated herein by reference.

TECHNICAL FIELD

The present disclosure relates to sensors, particularly for use in wireless or RFID applications.

TECHNICAL BACKGROUND

Smart sensors, which are designed to sense physical or chemical environmental conditions, are useful in wireless sensor networks (WSNs) for home and industrial applications to enhance system performance or system safety. Generally, a smart sensor node is configured to detect a condition, process data, and send information to a base station. Sensor nodes therefore typically consist of a small processing unit, one or more sensors, a radio or optical communication device, and a power source, usually in the form of a battery or energy harvesting module. Some unpowered sensor systems comprising transmitting, sensing, passive or active frequency conversion, and receiving elements have been proposed.

RFID tags are widely used in the identification and tracking of objects. Passive RFID tags are powered by the power transferred by an RFID reader. Active RFID tags have a local power source, such as a battery, to power the RFID chips. In conventional RFID systems, only stored information can be read from RFID tags since they can provide no sensing data about changes in the objects to which they are attached.

Resonant circuits can accurately sense material properties without destruction or contact. Such circuits are typically based on high quality factor (Q) resonators. Among them, microstrip resonators are of greatest interest because of their small size, low cost and ease of fabrication in comparison to dielectric and waveguide high Q resonators.

Vector modulators are commonly used in radio and wireless communications to generate complex modulation schemes. The use of a vector modulator eliminates the need for up-converting chains and leads to a simple and low-cost realization of different modulation schemes acting directly in microwave frequencies. Six-port structures use additive mixing instead of conventional multiplicative mixers to modulate or demodulate in-phase and quadrature components. A basic six-port receiver consists of three quadrature hybrids and one power divider to determine the phase of a microwave signal.

In industrial environments, many factors can influence the performance of sensors or data communications, such as temperature variations, blockages, time delays, and quantization method. Conventional low-power or unpowered sensors typically cannot deal with these problems without additional subsystems that increase complexity and power consumption.

BRIEF DESCRIPTION OF THE DRAWINGS

Example embodiments of the present invention are described with reference to the following drawings. In the drawings, like elements are assigned like reference numerals. The drawings are not necessarily to scale unless indicated.

DETAILED DESCRIPTION

Figure 1:
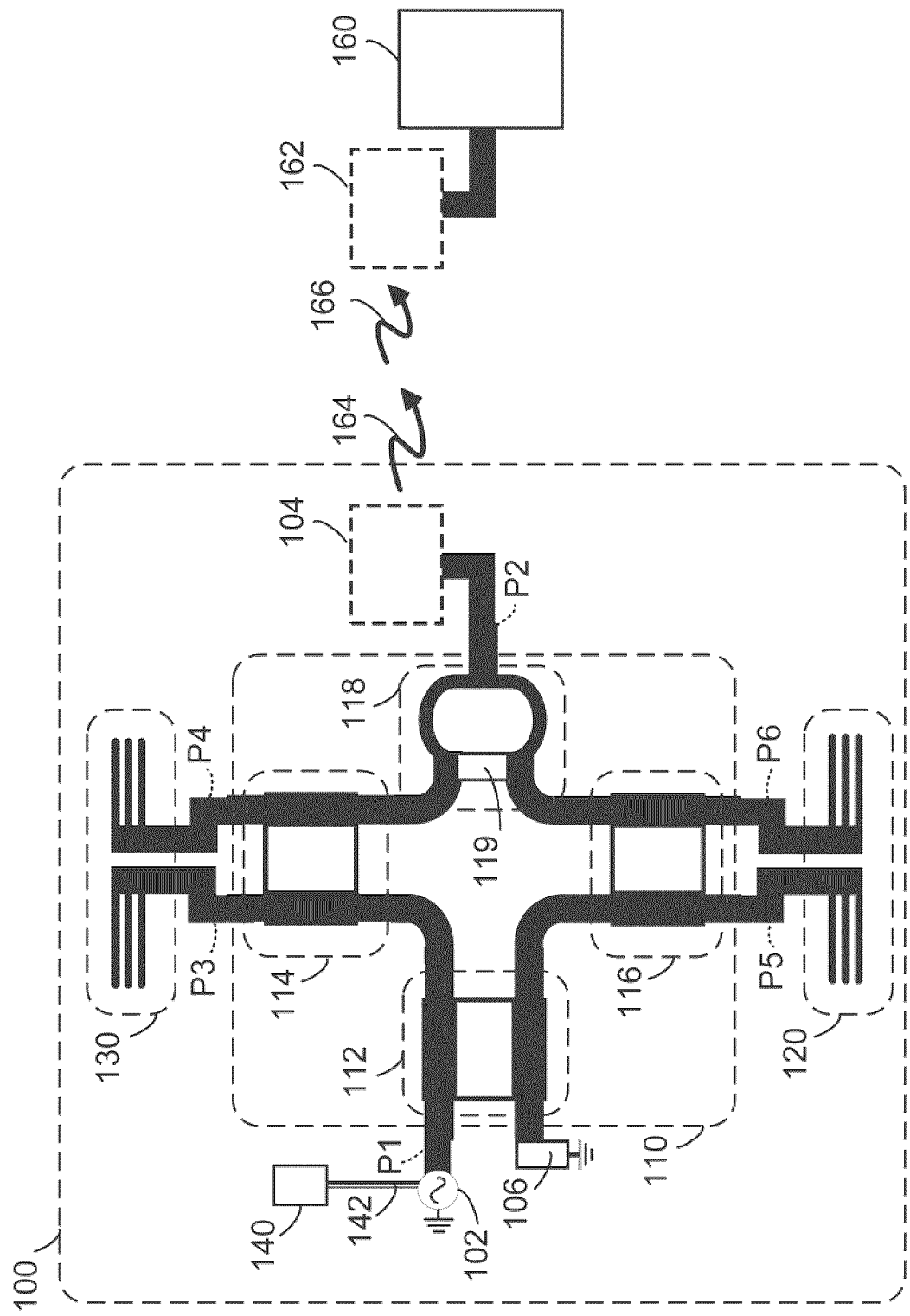
FIG. 1 is a schematic of a low-powered wireless sensor node and a gateway node.

The examples presented herein provide various embodiments of novel wireless/RFID sensors that integrate sensing and transmitting circuits. These sensors may be employed in near-to-zero (N-Zero) or zero power consumption applications, such as industrial processes, health care, water or food processing, and environmental/earth monitoring, temperature, sound, pressure, and so on.

In one aspect, an RFID/wireless sensor node includes a direct conversion sensor with multi-port structures, which simplifies the sensing system by integrating the sensor and modulator, thereby eliminating the need for a separate digitizer.

In another aspect, a low-powered wireless sensor comprises a signal generator, a modulator structure, two sensing circuits, and a transmitting element. For an operating frequency of $f_0$, a signal source at frequency of $f_0$ and a transmitting element at $f_0$ connect to input and output ports, respectively. The other ports connect to similar sensors. One sensor detects the physical, chemical, environmental, etc. variations or conditions to be detected in the sensor target (i.e. sensor data), while the other sensor provides reference data. The detected variations are used to modulate the input signal, which is transmitted to a gateway node for further analysis. The reference data can be used in a calibration procedure at the receiver.

In another aspect, a smart low-powered wireless/RFID sensor comprises a signal generator, a modulator structure, a sensing circuit, a pilot sequence generator, and a transmitting element. For an operating frequency of $f_0$, a signal source at the frequency of $f_0$ and a transmitting element at $f_0$ connect to input and output ports, respectively. The other ports operate as sensing and pilot ports, which connect to a sensor and a pilot sequence generator, respectively. The variations detected by the sensor provide the in-phase (or quadrature) data. The pilot sequence generator has two switches and four predefined loads. A control signal controls the switches to generate the pilot data, which provides the quadrature (or in-phase) data. The in-phase and quadrature data is used to modulate the input signal, which is transmitted to a gateway node. The pilot data can be used for calibration and channel estimation to reduce the overall error at the receiver. The pilot data can be generated based on a known RFID, ZigBee®, or Bluetooth® standard by a microcontroller or transponder integrated circuit (IC) and used for item identification.

In another aspect, an unpowered wireless sensor comprises a receiving element, a frequency multiplier, a modulator structure, two sensing circuits, and a transmitting element. The receiving element absorbs a pure signal transmitted by a gateway node at $f_0/M$. The M-times frequency multiplier comprises nonlinear elements and matching circuits, changes the frequency to $f_0$ and provides the signal to the input port of the modulator. A transmitting element at $f_0$ connects to the output port. The other ports connect to two similar sensors. The first sensor provides sensor data, while the other sensor provides reference data. The detected variations modulate the input signal, which is transmitted to a gateway node for further analysis. The reference data can be used in a calibration procedure at the receiver.

In another aspect, a smart unpowered wireless/RFID sensor comprises a receiving element, a frequency multiplier, a modulator structure, a sensing circuit, a low power pilot sequence generator, and a transmitting element. The receiving element absorbs a pure signal transmitted by the gateway node at $f_0/M$. The M-times frequency multiplier comprises nonlinear elements, input and output matching circuits, and a DC-RF separator. The DC part of the frequency multiplier's output provides the power for the switches and the pilot sequence generator. The RF part of the frequency multiplier's output provides the input signal of the modulator at $f_0$. A transmitting element at $f_0$ connects to the output port. The other ports are sensing and pilot ports, which connect to a sensor and a pilot sequence generator, respectively. The detected variations from the sensor provide the in-phase (or quadrature) data. The pilot sequence generator has two switches and predefined loads. A microcontroller or a mid-frequency signal (at $f_1$), as pilot data, controls both switches. This provides the quadrature (or in-phase) data. The in-phase and quadrature data directly modulate the input signal, which is transmitted to a gateway node. The pilot data can be used for calibration and channel estimation to reduce the overall error at the receiver. Moreover, the pilot data can be generated based on a known RFID, ZigBee, or Bluetooth standard by a microcontroller or transponder IC, and used in an identification process.

Still further, in another aspect a single frequency unpowered wireless sensor comprises a receiving element, a circulator, a modulator structure, two sensing circuits, and a transmitting element. The receiving element absorbs a pure signal transmitted by the gateway node at $f_0$ and the receive path of circulator provides the signal to the input port of the modulator. A transmitting element at $f_0$ connects to the output port. The other ports connect to two similar sensors. A first sensor provides sensor data, while the other sensor provides reference data. The detected variations (sensor data) modulate the input signal, which is transmitted to a gateway node for further analysis. The reference data can again be used in a calibration procedure at the receiver. At the gateway, a circulator separates the transmitted pure signal from the received modulated signal plus the self-coupled transmitted pure signal. As the self-coupled component is known to the gateway, it can be removed from the received signal, which can then be demodulated to extract the sensor data.

In yet another aspect, a single/multiple frequency smart unpowered wireless/RFID sensor comprises a receiving element, a circulator, a divider or diplexer, a modulator structure, a sensing circuit, a low power pilot sequence generator, and a transmitting element. The receiving element absorbs pure signals transmitted by the gateway node at $f_0$ or various frequencies of $f_0$ and $f_1$, and the receive path of circulator provides the signals to the input port of the modulator. In a single frequency system, the divider separates a part of input signal at $f_0$ to power up the node and provides the other part to the input port of the modulator. In a double frequency system, a diplexer separates absorbed frequencies and provides the component with frequency $f_1$ to power up the node, and the component with frequency $f_0$ to the input port of the modulator. Using a RF to DC converter (rectifier), the $f_1$ signal provides power for the switches and pilot sequence generator. The $f_0$ signal is the input signal to the modulator. A transmitting element at $f_0$ connects to the output port. The other ports are sensing and pilot ports, which connect to a sensor and the pilot sequence generator, respectively. The detected variations by the sensor provide the in-phase (or quadrature) data. The pilot sequence generator has two switches and predefined loads. A microcontroller or a mid-frequency signal (at $f_m$) as the pilot data controls both switches. The pilot data provides the quadrature (or in-phase) data. The in-phase and quadrature data directly modulate the input signal and transmits to a gateway node. The pilot data can be used in calibration and channel estimation to reduce the overall error at the receiver. Again, the pilot data can be generated based on a known RFID, ZigBee, or Bluetooth standard with a microcontroller or transponder IC, and can also be used in an identification (such as an RFID) process. At the gateway, a circulator separates the transmitted pure signal from the received modulated signal plus the self-coupled transmitted pure signal. As the self-coupled part is known to the gateway, it can be removed from the received signal, which is then demodulated to extract the sensed data.

FIGS. 1 through 8 illustrate the structure of different embodiments of a low-powered or unpowered wireless/RFID sensor in accordance with the aspects mentioned above.

Low-Powered Wireless Sensor

Referring first to FIG. 1, a first embodiment of a low-powered wireless sensor 100 is shown, comprising a signal generator 102, a modulator 110, first and second sensing circuits 120, 130, and a transmitting element 104. In this example, the signal generator 102 is a low-powered crystal oscillator and the transmitting element 104 is an antenna. A power source 140 provides power to the signal generator 102 via a connection 142. Although shown as a battery in this case, the power source 140 may be any suitable type of power source, such as a solar cell, a piezoelectric material, a super-capacitor, or a power-harvesting system.

Figure 2:
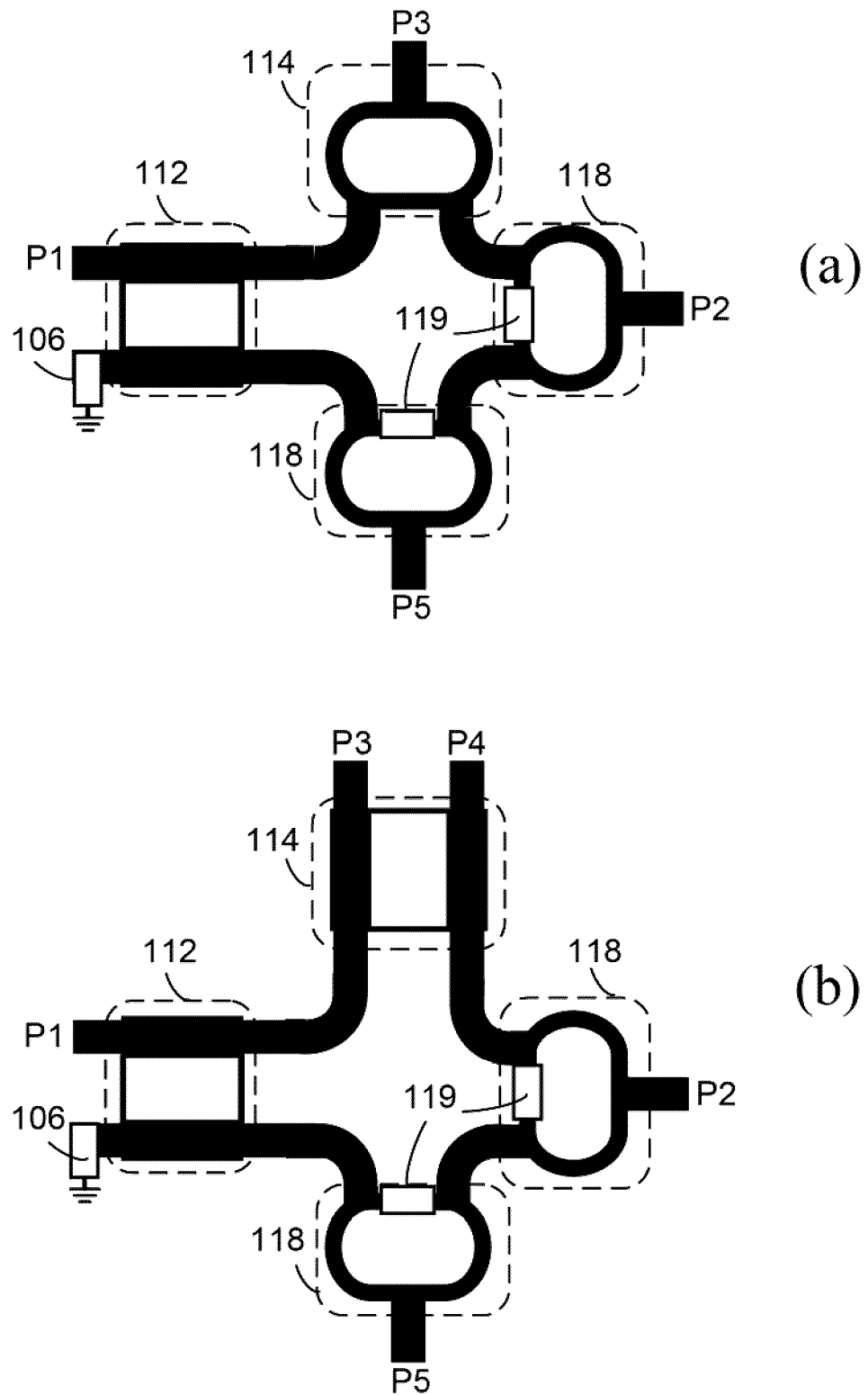
FIGS. 2(a), (b) and (c) are schematics of four-, five-, and six-port modulator structures, respectively, for use with a wireless sensor node.
Figure 2:
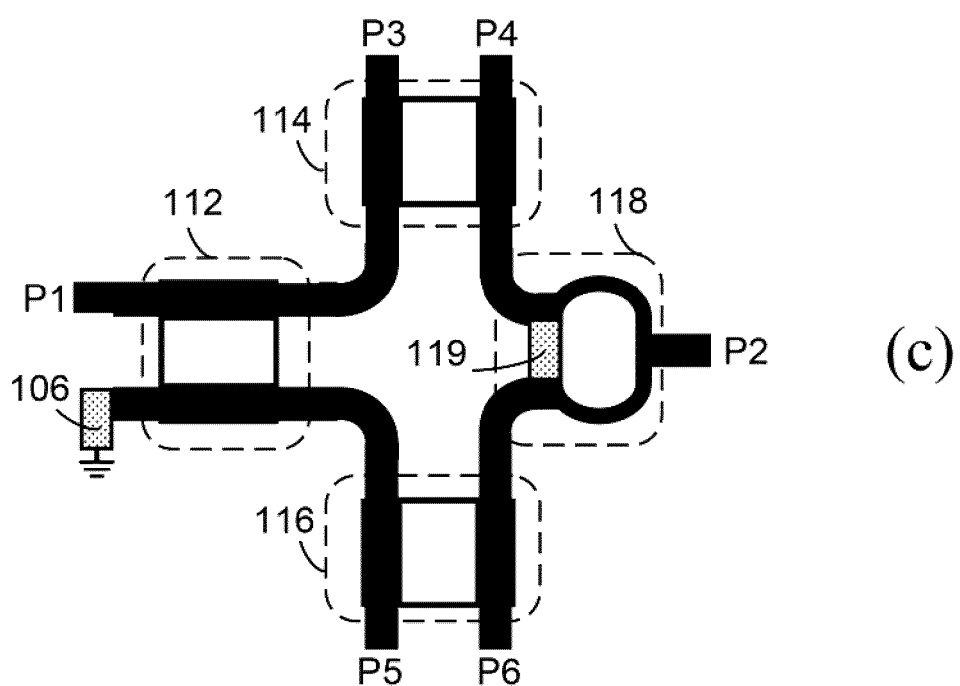

The modulator 110 may be any type of circuit adapted to modulate a signal onto another signal, such as a planar multi-port direct conversion structure. Multi-port structures having more than four ports can collect different phase-shifted versions of the input signal; in this example, the modulator 110 is a direct conversion six-port modulator consisting of three hybrid 90° couplers 112, 114, and 116 and one in-phase power combiner 118. However, a four-, five-, or six-port modulator structure (as shown in FIG. 2) may be employed with two (P3 and P4), three (P3, P4 and P5), and four (P3, P4, P5, and P6) sensing ports, respectively. A 100-ohm isolation resistor 119 is provided for the power combiner and a 50-ohm matching resistor 106 is used to terminate the unneeded port. The signal generator 102 at operating frequency $f_0$ connects to the input port P1, and the transmitting element 104, configured to operate at $f_0$, connects to the output port P2. The first pair of sensor ports P5, P6 connect to the first sensing circuit 120 and the second pair of sensor ports P3 and P4 connect to the second sensing circuit 130.

The sensing circuits 120, 130 in this example are both microwave resonator sensors. However, any type of sensitive circuit that can provide variable input impedance in response to a detected sample ("sensor data") may be used instead of the illustrated resonator sensors in this implementation, and is contemplated herein. One of the first and second sensing circuits 120, 130 detects the variations or conditions to be monitored by the low-power wireless sensor; the other sensing circuit 130 or 120 operates as a reference, generating reference data. The data from the first and second sensing circuits 120, 130 are each used by the couplers 116, 114 to modify the input signal $f_0$ received at the port P1. The modified signals are combined at the combiner 118 and output as a modulated output signal at port P2, as discussed in further detail below. The modulated output signal is then transmitted by the transmitting element 104 as transmitted signal 164 and received by a receiving element 162 (e.g., an antenna) as received signal 166 at a node 160. The transmitting element 104 and the receiving element 162 may be any suitable transmitting and receiving element configured for communication using a wireless (i.e., not fixed) connection, such as by electromagnetic, inductive, capacitive, and optical coupling or transmission. The node 160 may be a gateway node connected to other elements in a network or system, and may be configured to extract the sensor data from the received signal 166 for analysis, and to process data. Thus, the node 160 may include a microcontroller, and may be any suitable computing device provided with or in communication with a suitable receiving element 162. The reference data encoded in the received signal 166 can be used by the node 160 for calibrating the first sensing circuit 120.

Figure 3:
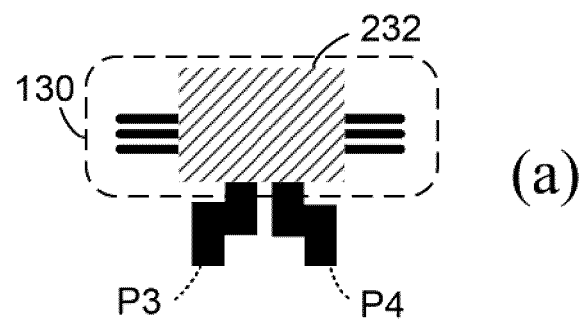
FIG. 3 shows an example of a test sample and a reference sample in relation to corresponding sensing circuits of the wireless sensor node.
Figure 3:
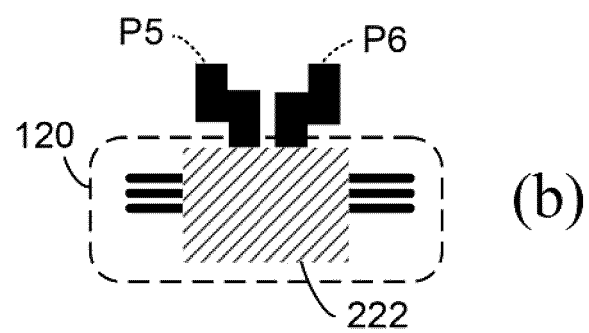

In one illustrative application shown in FIG. 3, the low-powered wireless sensor node 100 of FIG. 1 is used as a material detector. A reference sample (Ref) 222 and a sample under test (SUT) 232 are placed on resonator sensing circuits 220 and 230, respectively. The sensing circuit 230 detects the condition of the test sample 232 and generates sensor data, which directly modulates the input signal of frequency $f_0$ to generate a modulated output signal. The transmitting element 104 transmits the modulated output signal as the transmitted signal 164 having frequency $f_0$ to the node 160 via the receiving element 162 for further analysis.

Referring again to FIG. 1, the signal from the low-powered oscillator 102 is divided into in-phase (I) and quadrature (Q) paths by the first coupler 112. For a given reference input signal $a_{LO}(t)$ at input port Pi, the output signal $a_T(t)$ at output port Pj in a six-port circuit as in FIG. 1 can be represented as:

$$a_T = \sum_{i=3}^{6} S_{i1} S_{2i} \Gamma_i a_{LO} \quad (2)$$

$$\begin{cases} S_{i1} = |S_{i1}| e^{j\theta_{i1}} \\ S_{2i} = |S_{2i}| e^{j\theta_{2i}} \end{cases}$$

where $S_{ij}$ are scattering parameters between ports Pi and Pj and $\Gamma_i$ is the reflection coefficient. In order to have a good reflection coefficient at the input port, the following equation should be satisfied:

$$\sum_{i=3}^{6} S_{i1} S_{1i} \Gamma_i = 0. \quad (2)$$

A simple way to implement the above condition is using the quadrature reflection phase shifting characteristics of the couplers 114 and 116. In these structures, reflections from ports P3-P4 and P5-P6 cancel each other out when the reflectors at P3 and P5 are the same as P4 and P6, respectively. In that case, the sensing circuits 220 and 230 in FIG. 1 produce variable loads for the sample under test (SUT) 232 and reference sample (Ref) 222, respectively, complex reflection coefficients of $\Gamma_{SUT} = I_{SUT} + jQ_{SUT}$ and $\Gamma_{Ref} = I_{Ref} + jQ_{Ref}$ from P3 to P4 and from P5 to P6, respectively. Furthermore, in the case of an ideal combiner 118 and couplers 112-114, the transmitted signal at P2 is simplified as:

$$a_T = \frac{(\Gamma_{Ref} + j\Gamma_{SUT})}{2} a_{LO} \quad (3)$$

and the overall transmission coefficient from P1 to P2 is:

$$\Gamma_T = (\Gamma_{Ref} + j\Gamma_{SUT})/2 \quad (4)$$

Therefore, the output signal is composed of two vector components, i.e. $\Gamma_{Ref}$ and $j\Gamma_{SUT}$ which are in a semi-orthogonal vector space and easy to separate at the receiver.

On the receiving end at the node 160, a quadrature demodulator may separate the real and imaginary parts of the received signal as:

$$\Gamma_R = I_R + jQ_R. \quad (5)$$

In the ideal communication channel, the normalized transmitted signal 164 is equal to the received one 166 and considering the (4), we have:

$$\Gamma_R = \Gamma_T = (\Gamma_{Ref} + j\Gamma_{SUT})/2, \tag{6}$$

At the first step, when the system is started in the free state (R0) for both the reference sample (Ref) 222 and the sample under test (SUT) 232, the $\Gamma_{Ref}$ is equal to the $j\Gamma_{SUT}$ and can be calculated simply from $\Gamma_{R0}$ by:

$$\Gamma_{Ref} = \Gamma_{R0} - j\Gamma_{R0}, \tag{7}$$

Then, for each sample under test (SUT) 232 we have:

$$\Gamma_{SUT} = j(\Gamma_{Ref} - 2\Gamma_R), \tag{8}$$

and from the calculated $\Gamma_{SUT}$ and from $\Gamma$ versus the relative permittivity $\varepsilon_r$ of the sensor, the value of the relative permittivity $\varepsilon_r$ of the sample under test 232 can be estimated.

Smart Low-Powered Wireless/RFID Sensor

Figure 4:
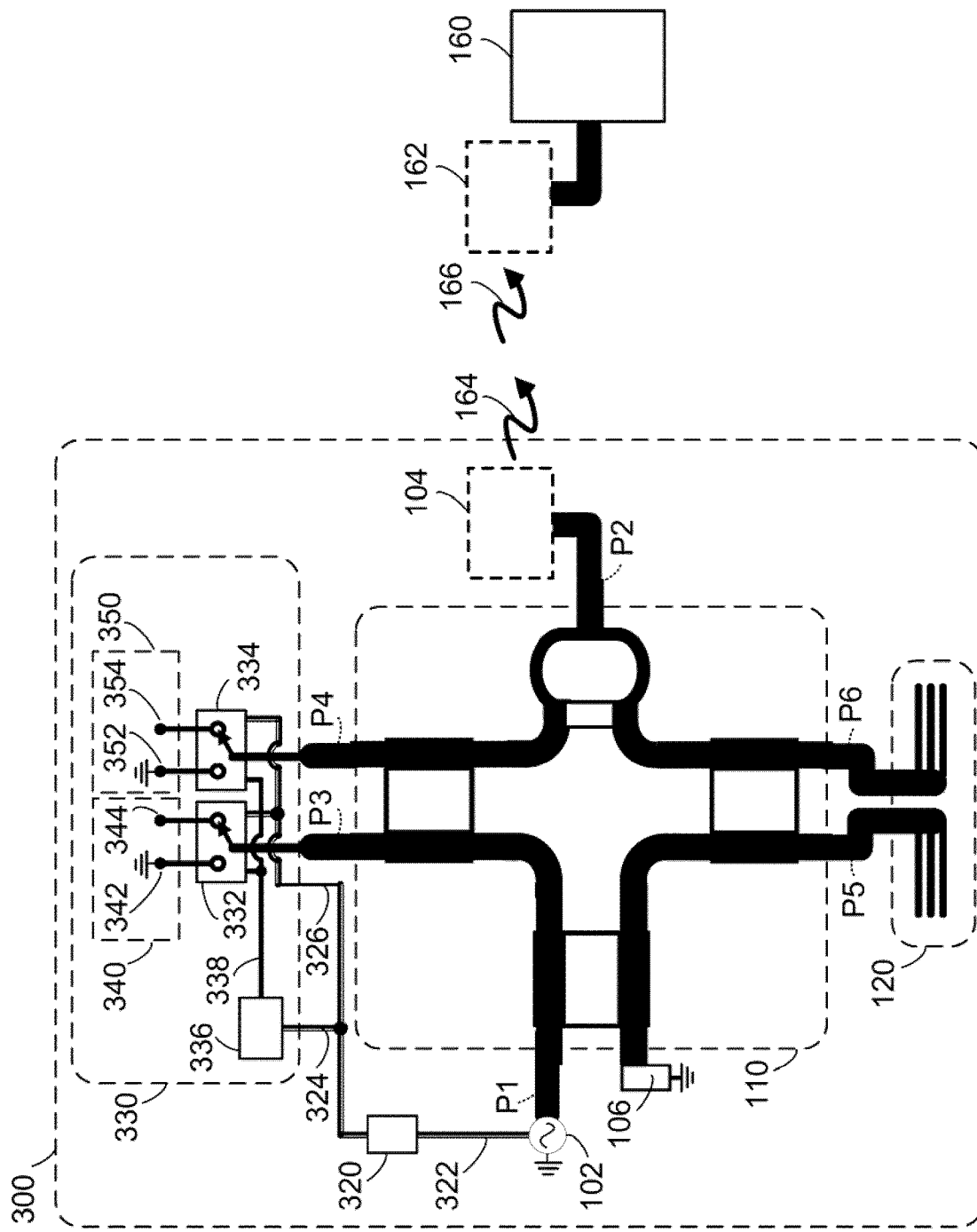
FIG. 4 is a schematic of a smart low-powered wireless/RFID sensor node and a gateway node.

FIG. 4 illustrates a further embodiment of a low-powered sensor, here a smart low-powered wireless/RFID sensor 300. The embodiments described herein referred to as "smart" are embodiments incorporating pilot data and identification data, as described below. It will be appreciated by those skilled in the art that the example "smart" sensors described here can include further capabilities—for example, additional sensing structures—generating additional data that may be encoded in the signals transmitted from the sensor 300. The sensor 300 comprises a signal generator 102, a modulator 110, a sensing circuit 120, a pilot sequence generator 330, and a transmitting element 104. The signal generator 102, modulator 110, sensing circuit 120, and transmitting element 104 may be the same types as described above.

The signal generator 102, operating at frequency $f_0$, connects to the input port P1 of the modulator 110 and the transmitting element 104, also operating at frequency $f_0$, connects to the output port P2. The sensing circuit 120 is connected to the sensor ports P5 and P6, while pilot sequence generator 330 is connected to the pilot ports P3 and P4. The modulator 110 produces a directly modulated output signal at port P2 using sensor data generated by the first sensing circuit 120 and pilot data generated by the pilot sequence generator 330. The pilot data may be known to the node 160. In the examples herein, the pilot data may comprise a fixed value such as an identifier (e.g., such as that used in for RFID identification), or optionally other arbitrary or non-arbitrary data sequences comprising with ZigBee, Bluetooth, or other standards. The pilot data, when obtained by the node 160, may be used in processing the sensor data also received by the node 160.

The pilot sequence generator 330 has two N-state (multistate) switches 332 and 334 (thus, N=2 in this example), each connecting to one of a corresponding set of N predefined loads 340, 350 respectively. In the example of FIG. 4, there are thus four predefined loads 342 (short circuit), 344 (open circuit), 352 (short circuit), and 354 (open circuit). A control signal 338 from the controller 336, preferably a mid-frequency signal, provides the in-phase pilot data I(t) to control the multi-state switches 332 and 334 at ports P3 and P4 in the upper branch of the modulator 110. For simplicity, only two marginal reflection states provided by the predefined loads are available for selection: short (loads 342, 352) and open (loads 344, 354) circuits. This fixes the complex reflection coefficients of $\Gamma_0$ and $-\Gamma_0$ for I(t)=0 and 1, respectively. In other implementations, the loads 342, 344, 352, 354 may be provided by variable load devices such as resistors or capacitors with voltage- or current-controlled impedances.

In the bottom branch of the modulator 110, the ports P5 and P5 are connected to the sensing circuit 120, which provides a variable load with a complex reflection coefficient of FSUT. Any change in the input impedance of sensing circuit 120, due to the variations or conditions of a sample under test (SUT) 232 placed on the sensing circuit 120, is directly modulated in the output signal at P6. The combiner 118 is used to combine the signals of the upper and lower branches of the modulator 110. In the case of ideal combiners 118 and couplers 112-116, the output signal at port P2 can be simplified as:

$$a_{RF} = 2S_{31}S_{23}((-1)^{I(t)}\Gamma_0 + j\Gamma_{SUT})a_{LO}, I=0,1. \tag{9}$$

The output signal is thus composed of two vector components, i.e. $(-1)^{I(t)}\Gamma_0$ and $j\Gamma_{SUT}$, with the first one being known at the node 160. The output signal is transmitted using transmitting element 104 and is sent as transmitted signal 164 with frequency $f_0$. The signal is received as received signal 166 by receiving element 162 of the node 160, where the received signal 166 can be decoded and analyzed. The pilot data extracted from the received signal 166 may be used for identification (such as an RFID), sensor calibration, and channel estimation purposes at the node 160.

The controller 336 in these examples can be a microcontroller adapted to implement any suitable signal type that can be used to provide pilot data, including standard signals, such as ZigBee, Bluetooth, and RFID. Thus, the sensor 300 can function both as an RFID tag or similar wireless identification tag, and as a sensor device in a wireless sensor network. Alternatively, the controller 336 may operate as a mid-frequency signal generator operating at frequency $f_1$ to generate a simple, unique data sequence while consuming less power than a controller generating standard signals.

A power source 320 provides power to the signal generator 102 via a connection 322, to the controller 336 via another connection 324, and to the switches 332 and 334 via a further connection 326. Although shown as a battery in this case, as explained above the power source 320 may be any suitable type of power source, such as a solar cell, a piezoelectric material, a super-capacitor, or a power-harvesting system.

Unpowered Wireless Sensor

Figure 5:
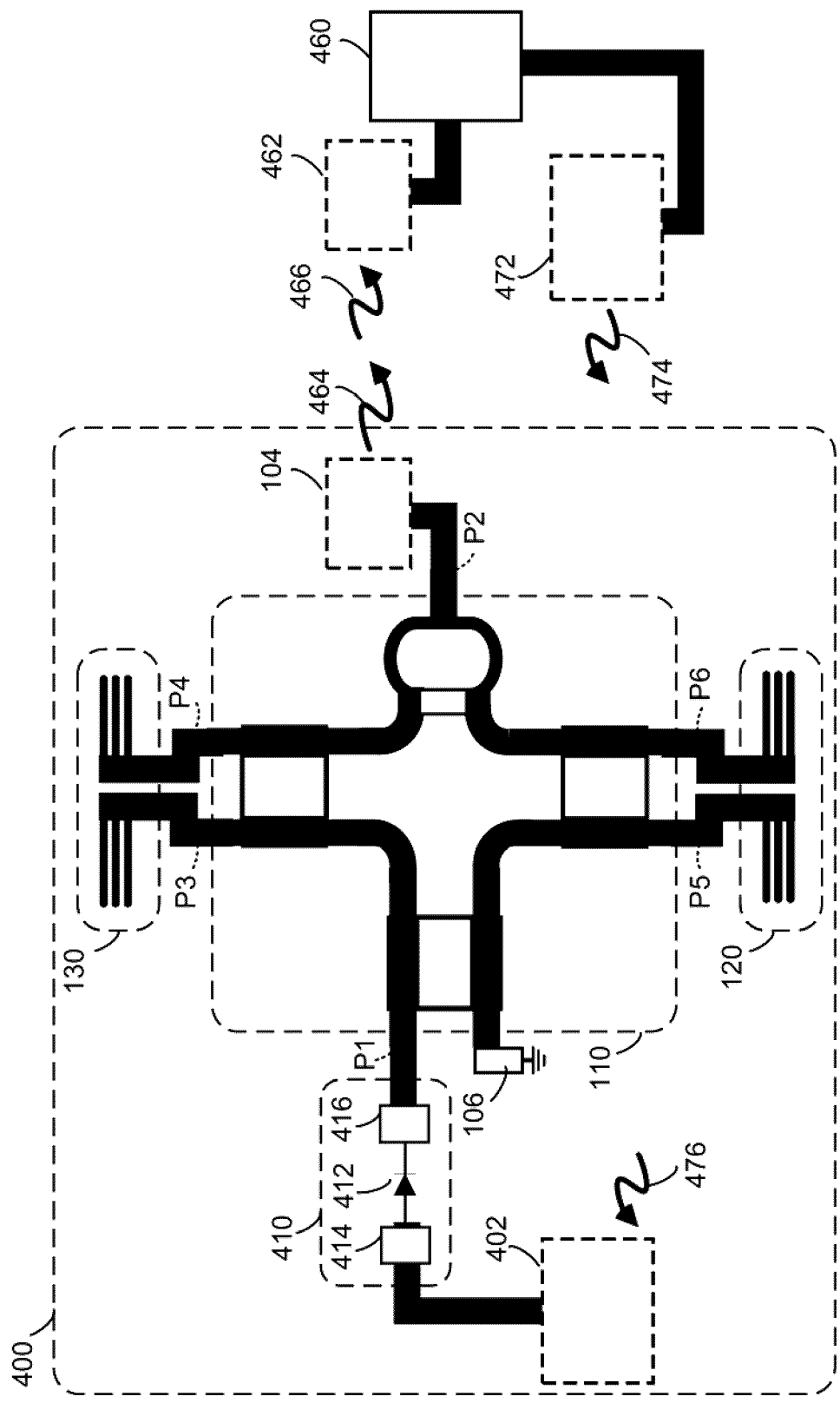
FIG. 5 is a schematic of an unpowered wireless sensor node and a gateway node.

In another embodiment, an unpowered wireless sensor 400 is provided, as shown in FIG. 5. The sensor 400 comprises a receiving element 402, a frequency multiplier 410, a modulator 110, first and second sensing circuits 120, 130, and a transmitting element 104. The modulator 110, sensing circuits 120 and 130, and the transmitting element 104 may be the same types as described above. The unpowered wireless sensor 400 operates in conjunction with a node 460, which as before may be a gateway node. The node 460 is provided with a receiving element 462 as well as a transmitting element 472. The receiving and transmitting elements 462, 472 may be antennas as in the illustrated example.

The node 460 transmits, via its transmitting element 472, a pure signal 474 of frequency of $f_0/M$ which is received by the sensor 400 by its receiving element 402 as received signal 476. An M-times frequency multiplier 410, in this example a passive diode doubler (i.e., M=2), comprises nonlinear elements 412, such as diodes or transistors, and input and output matching circuits 414 and 416. The due to its nonlinearity, the output signal of the diode 412 has a harmonic at M times the frequency input (in this example, at 2× the input). Consequently, the output matching circuit 416 only passes the signal with frequency $f_0$. This modified signal is provided as input at port P1 of the modulator 110.

The ports P3 and P4 of the modulator 110 connect to the first sensing circuit 120, while the ports P5 and P6 connect to the second sensing circuit 130. As in the first embodiment described above, one of the first and second sensing circuits 120, 130 detects the variations or conditions to be monitored by the low-power wireless sensor, producing sensor data; the other sensing circuit 130 or 120 operates as a reference, generating reference data. If the unpowered wireless sensor 400 is implemented as a material detector, a reference sample 222 and a test sample 232 are placed on the first and second sensing circuits 120 and 130, as described above with reference to FIG. 3. The sensor data from the first and second sensing circuits 120, 130 are used by the couplers to modulate the input signal at frequency $f_0$ received from the input port P1. The modulated signal is output at port P2 to the transmitting element 104, which operates at frequency $f_0$ to transmit the modified output signal as output signal 464 to the node 460. The architecture of the unpowered sensor 400 is thus similar to the low-powered sensor, except that the input signal at port P1 is extracted from the received signal 474, and there is no power source in the sensor 400.

The receiving element 462 of the node 460 receives the signal from the sensor 400 as received signal 466. On receipt of the signal 466, the node 160 may extract the sensor data for analysis, while the reference data may be extracted for use in calibration. The frequency $f_0$ of the received wave 466 is in a different region of the frequency domain from the originally transmitted signal 474 at frequency $f_0/M$.

The corresponding pairs of transmitting elements and receiving elements 104, 462 and 462, 472 may be antennas or any other suitable transmitting and receiving element, as mentioned above.

Smart Unpowered Wireless/RFID Sensor

Figure 6:
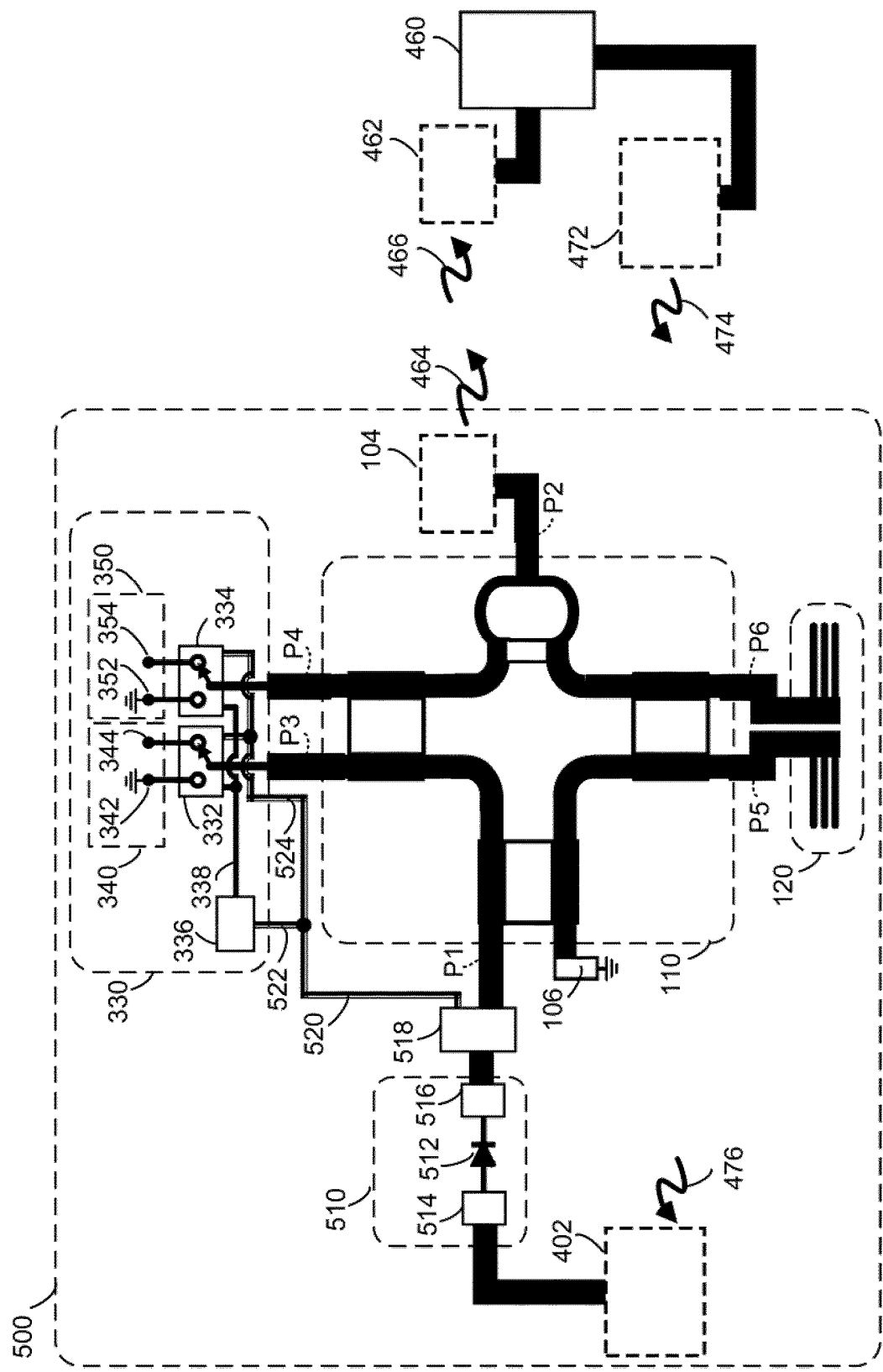
FIG. 6 is a schematic of a smart unpowered wireless/RFID sensor node and a gateway node.

FIG. 6 illustrates a smart unpowered wireless/RFID sensor 500 embodiment. The architecture is similar to the smart low-powered sensor examples above, except that the input signal and bias signals powering the sensor 500 are obtained from a received signal. The sensor 500 comprises a receiving element 402, a frequency multiplier 510, a modulator 110, a sensing circuit 120, a pilot sequence generator 330, and a transmitting element 104. These components may be the same type as the components described above with reference to the other illustrated embodiments. The node 460 may be configured in a similar manner to the node 460 described above with reference to FIG. 5, and receiving and transmitting elements 472, 402 and 104, 462 may be any suitable elements as discussed above.

In this embodiment, the node 460 transmits via its transmitting element 472 a pure signal 476 with a frequency of $f_0/M$. The pure signal is received as received signal 476 by the receiving element 402 of the sensor 500 and passed to an M-times frequency multiplier 510. The M-times frequency multiplier 510 (M=2 in this example) comprises nonlinear elements 512 and input/output matching circuits 514/516. Then, a low-pass filter inside the DC-RF separator 518 extracts the DC component of the signal. This portion of the signal is used as the bias for the controller 336 and switches 332, 334 of the pilot sequence generator 330 via lines 520, 522 and 524. The RF component having a $f_0$ harmonic is extracted using a band pass filter of the separator 518, and is input to the port P1 of the modulator 110. The input signal to the modulator 110 at port P1 therefore has frequency $f_0$.

Ports P3, P4 are connected to a pilot sequence generator 330 and ports P5, P6 are connected to a sensing circuit 120. The pilot sequence generator 330 and sensing circuit 120 may be configured as described above with reference to FIG. 4. As in the example of FIG. 4, the pilot data generated by the pilot sequence generator 330 and the sensor data from the sensing circuit 120 provide the quadrature and in-phase data (or vice versa) used by the modulator 110 to directly modulate the signal output at port P2, which has frequency $f_0$. Also as described above with respect to FIG. 4, the signal 464 transmitted by the transmitting element 104 connected to port P2 is received as received signal 466 by receiving element 462 of the node 460, where the received signal 466 can be decoded and analyzed. The pilot data extracted from the received signal 466 may be used for identification (such as an RFID), sensor calibration, and channel estimation purposes at the node 460.

Single-Frequency Unpowered Wireless Sensor

Figure 7:
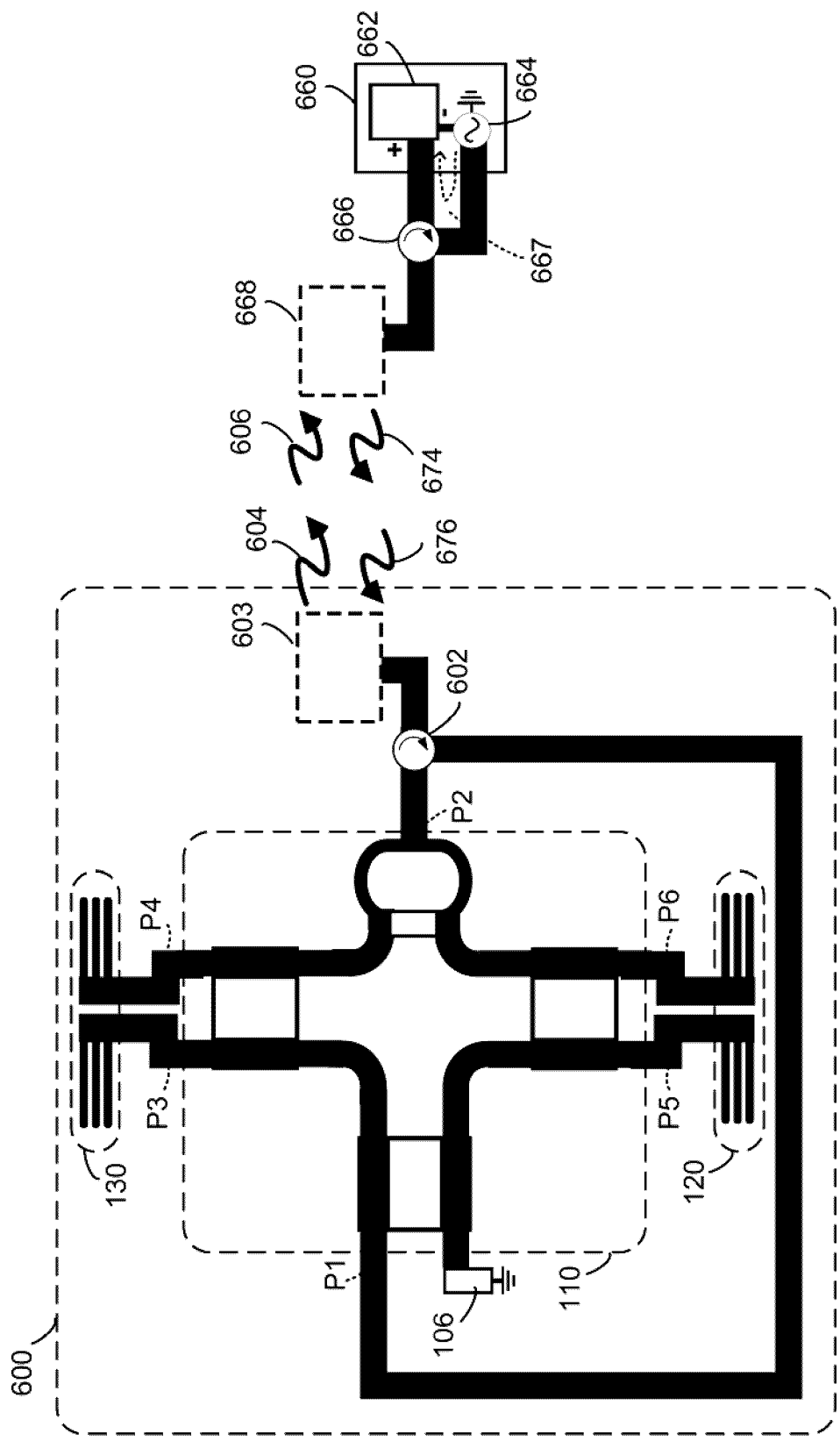
FIG. 7 is a schematic of a single frequency unpowered wireless sensor node and a gateway node.

FIG. 7 illustrates a further embodiment, a single-frequency unpowered wireless sensor 600. The sensor 600 comprises a receiving/transmitting element 603, a receive/transmit separator 602, a modulator 110, and two sensing circuits 120, 130. The modulator 110 and sensing circuits 120, 130 may be components as generally described above with reference to other embodiments. The separator 602 may be a circulator.

The node 660, which as before may be a gateway node, is provided with a receiver 662 (which in this example includes a down-converter and processor) and a signal generator 664 in communication with a circulator 666. The signal generator 664 generates a pure signal at frequency $f_0$, which is transmitted via the circulator 666 to the receiving/transmitting element 668 and thence as signal 674 to the sensor 600. The receiving/transmitting elements 104, 668 may be an antenna or any other suitable component as discussed above.

The receiving element 603 receives the signal generated by the node 660 as received signal 676. This signal is received by a first port of the separator 602, which passes the received signal through a second port to the input port P1 of the modulator 110. The output port P2 of the modulator 110 is connected to a third port of the separator 602. The other ports P3, P4, P5, and P6 of the modulator 110 are connected to two similar sensing circuits 120, 130, generally as described above with reference to FIGS. 1 and 5. Thus, one sensing circuit 120, 130 detects variations or conditions in the target to produce sensor data, while the other sensing circuit 130, 120 operates as a reference, producing reference data. The sensor 600 can be used as a material detector in the same general manner as described above with reference to FIG. 3.

The sensor data and reference data produced by the sensing circuits 120, 130 directly modulate the input signal in the modulator 110. The modulated signal is output to port P2, and transmitted by the receiving/transmitting element 603 as output signal 604. This signal is received by the receiving/transmitting element 668 of the gateway 660, then passed via the circulator 666 to the receiver 662. In a self calibration process, the self-coupling of signal 664 into the receiver 662 is determined. Then, the node 660 can remove the self-coupled signal 667 from the received signal, and extract the sensor data for analysis. The reference data may also be extracted by the node 660, and used for calibration.

Single/Multiple-Frequency Smart Unpowered Wireless/RFID Sensor

Figure 8:
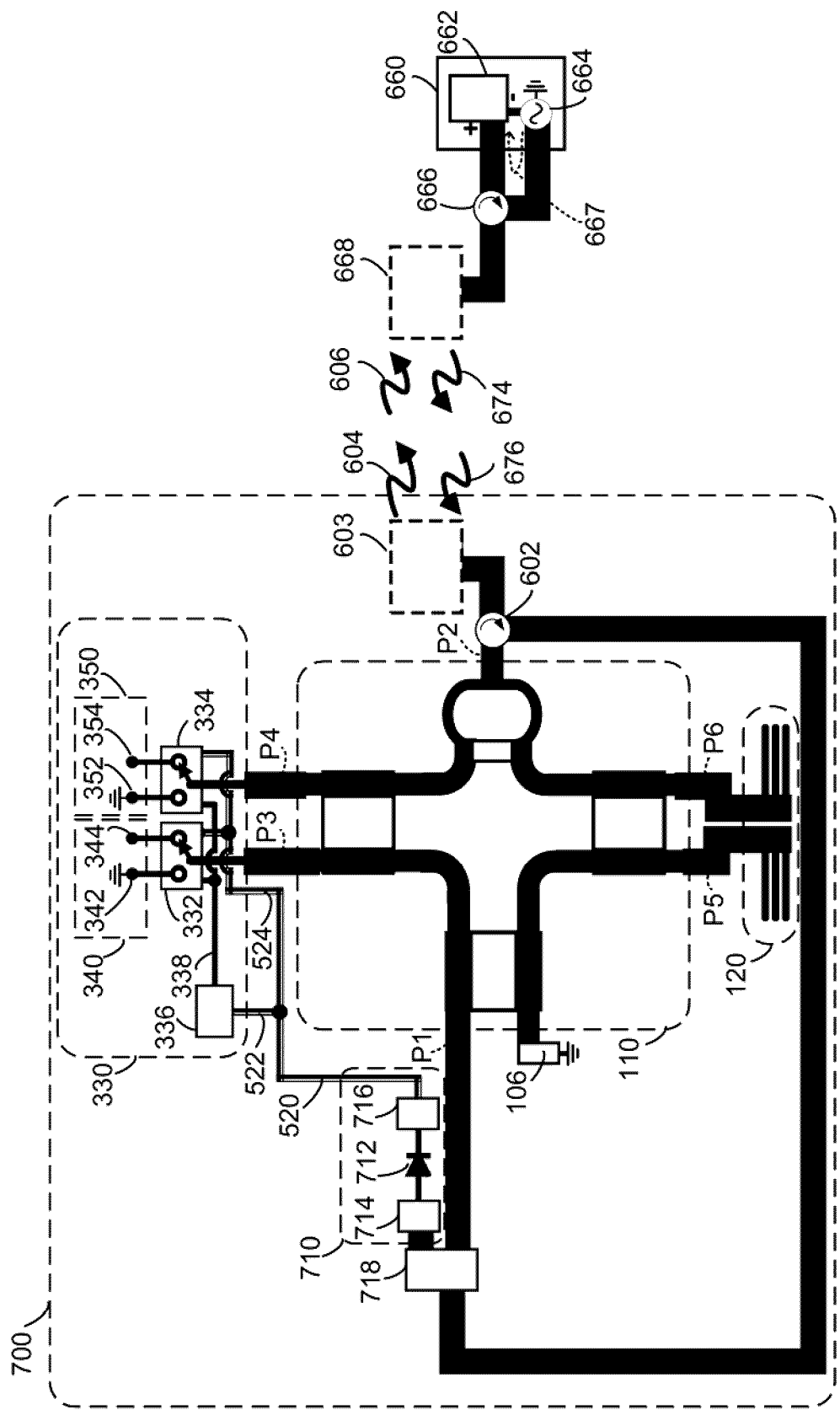
FIG. 8 is a schematic of a single/multiple frequency smart unpowered wireless/RFID sensor node.

In a further embodiment, a single/multiple frequency smart unpowered wireless/RFID sensor 700 is provided, as illustrated in FIG. 8. The sensor 700 in this embodiment comprises a receiving/transmitting element 603, a receive/transmit separator 602, a modulator 110, a sensing circuit 120, and a pilot sequence generator 330. These components are generally described above with reference to other embodiments.

The node 660 is provided with a receiver 662 and a signal generator 664 in communication with a circulator 666. The signal generator 664 generates a pure signal at frequency $f_0$, or at various frequencies $f_0$ and $f_1$. The signal is transmitted via the circulator 666 to the receiving/transmitting element 668 and thence as signal 674 to the sensor 600. The receiving/transmitting elements 104, 668 may be an antenna or any other suitable component as discussed above.

The receiving/transmitting element 603 of the sensor 700 receives the signal generated by the node 660 as received signal 676. The received signal 676 is provided to a first port of the separator 602, which passes the received signal through a second port to a divider or diplexer 718. In a single frequency system where the input signal at the separator 602 is at a single frequency $f_0$, the divider 718 directs part of the input signal to an RF to DC converter 710, and the remainder of the signal to the input port P1 of the modulator 110. The RF to DC converter 710 comprises nonlinear elements (such as diodes or transistors) 712 and input and output matching circuits 714, 716 to produce an output DC signal, which provides power for the pilot sequence generator 330 via lines 522 (to the controller 336) and the switches 332 and 334 (via line 524). In a mixed frequency system, a diplexer 718 diverts the portion of the signal with frequency $f_1$ to the RF to DC converter 710 to power the pilot sequence generator 330, and the frequency $f_0$ portion to the input port P1 of the modulator 110.

The output port P2 of the modulator 110 is connected to a third port of the separator 602, while ports P5 and P6 are connected to the sensing circuit 120, and ports P3 and P4 are connected to the pilot sequence generator 330. As described above, the pilot sequence generator 330 operates to produce pilot data input to the modulator 110, while the sensing circuit 120 produces sensor data input to the modulator 110. These inputs to the modulator 110 provide the quadrature and in-phase parts (or vice versa) that are used to directly modulate the input signal received at port P1. The modulated output signal is output at P2 to the connected receiving/transmitting element 603, which transmits the modulated output signal as signal 604 to the node 660.

The receiving/transmitting element 668 of the node 660 receives the signal as received signal 606, and passes the received signal to the receiver 662 via the circulator 666. As mentioned above, the self-coupled portion of the signal 667 can be removed from the received signal at the receiver 662, and the sensor and pilot data can be extracted for analysis, calibration, and channel estimation.

Experimental Results

Each sensor subsystem described above was designed, fabricated, and tested at an operating frequency of 2.45 GHz. The test system employed a R&S® ZVA67 vector network analyzer (VNA) and a Tektronix™ DPO71604C digital oscilloscope for scattering parameter and time domain signal measurements, respectively. Simple patch antennas were used for wireless transmission to and from the sensor. Signals received from the sensors were collected by the oscilloscope and processed to extract the sensing information and pilot data.

The overall system was then tested with various standard samples. All circuits are fabricated with printed circuit technology using RO4003 laminate from Rogers Corporation, Arizona, USA, which has a relative permittivity of about 3.55, thickness of 0.508 mm, and a loss tangent of 0.0027.

FIG. 9(a) is a schematic of the fabricated low-powered sensor represented schematically in FIG. 1, with dimensions indicated in FIG. 9(b) as set out in Table 1:

TABLE 1

Dimensions of fabricated low-powered sensor.

| Parameter | Quantity (mm) | Parameter | Quantity (mm) |
|---|---|---|---|
| $w_0$ | 1.13 | $L_0$ | 5.00 |
| $w_1$ | 1.13 | $L_1$ | 18.8 |
| $w_2$ | 1.91 | $L_2$ | 18.8 |
| $w_3$ | 1.13 | $L_3$ | 22.4 |
| $w_4$ | 0.30 | $L_4$ | 10.2 |
| $w_5$ | 1.13 | $L_5$ | 5.00 |
| $w_6$ | 0.25 | $L_6$ | 2.35 |
| $s_4$ | 0.7 | | |

The sensing circuit in this example consists of a quadrature coupler and a sample area which provides a SUT-related capacitive loading for the coupler. Coupons were extracted from various Rogers Corporation laminates by removing the metal foil, thus yielding samples with $\varepsilon_r$=2.2, 3.55, 4.5, 6.0, 10.2, and 12.85. Each of these samples were placed on the sample area.

Figure 10:
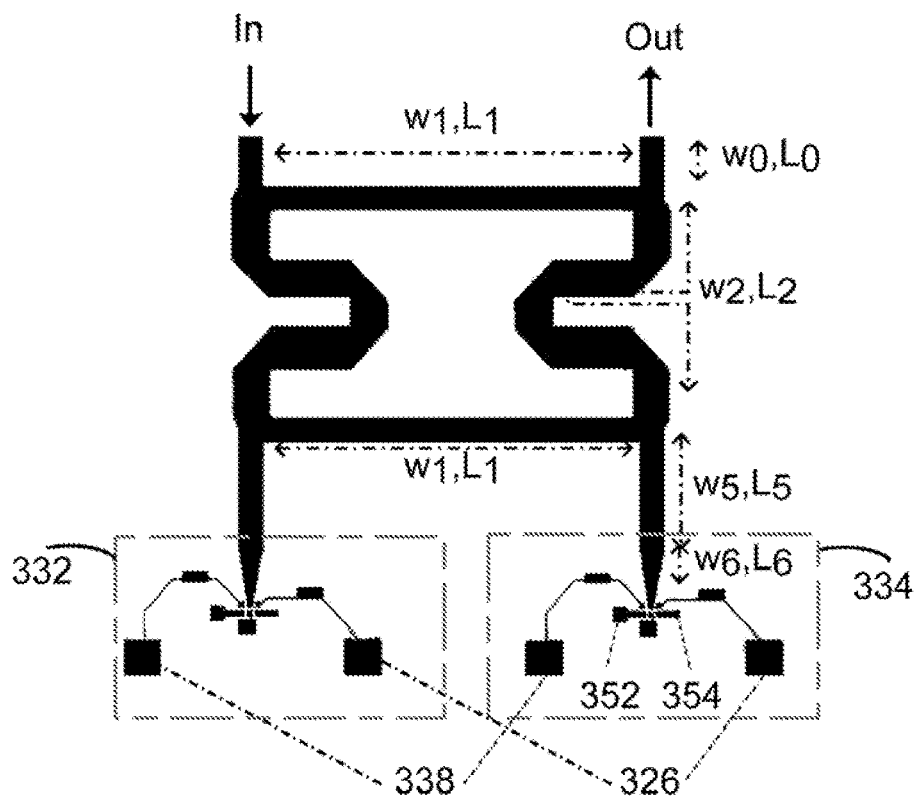
FIG. 10 is a schematic of the fabricated pilot modulator circuit.

FIG. 10 is a schematic of a fabricated pilot modulator circuit with the same dimensions indicated in Table 1. The pilot modulator circuit is composed of a quadrature coupler and two low insertion-loss Infineon Technologies BGS12SN6 RF MOS switches SW1 and SW2. The bias voltage $V_{Bias}$ was 3.4V and the control voltage $V_{Ctl}$ representing pilot data was modified by a periodic pulse between 0V and 3V. The time between control and RF is about 500 ns for this type of switch; accordingly, the frequency of the pilot modulator circuit 900 was selected as 100 KHz to ensure sufficient time for stable switching between two states in each period. However, in principle there is no frequency limitation if a correspondingly faster switch is used.

Figure 9:
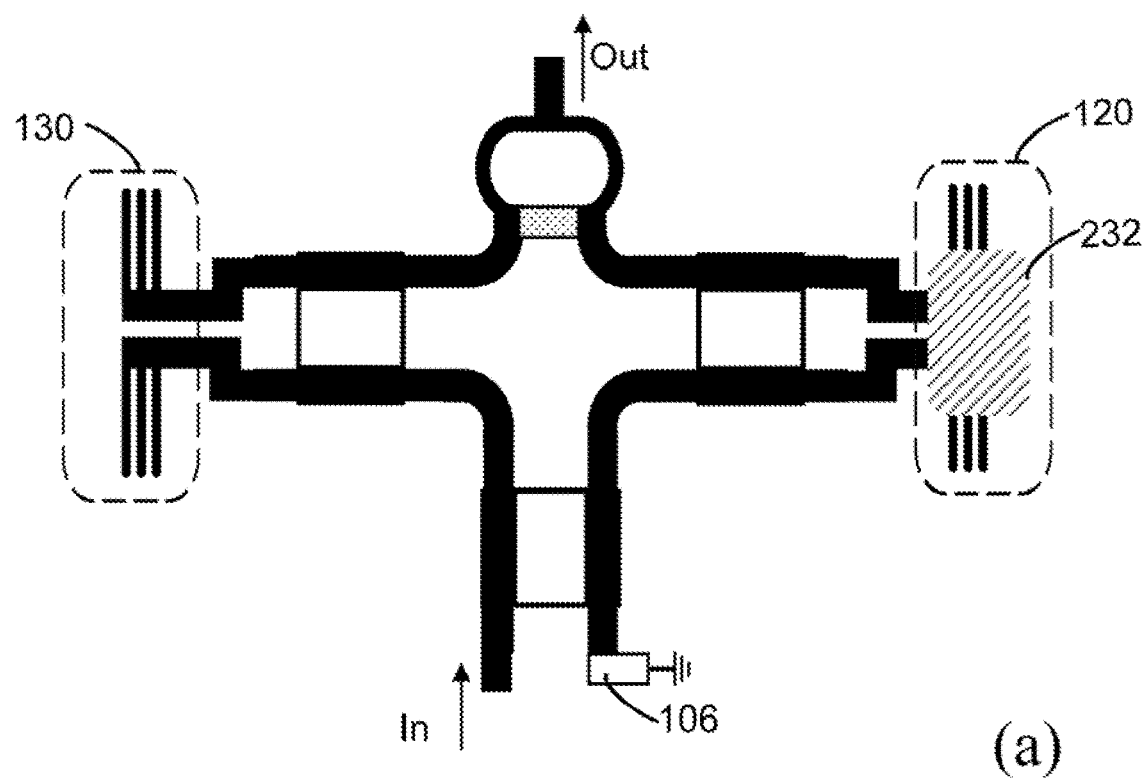
FIGS. 9(a) and (b) are a schematic of a fabricated low-powered wireless sensor and a schematic of a portion of the fabricated low-powered wireless sensor, respectively.
Figure 9:
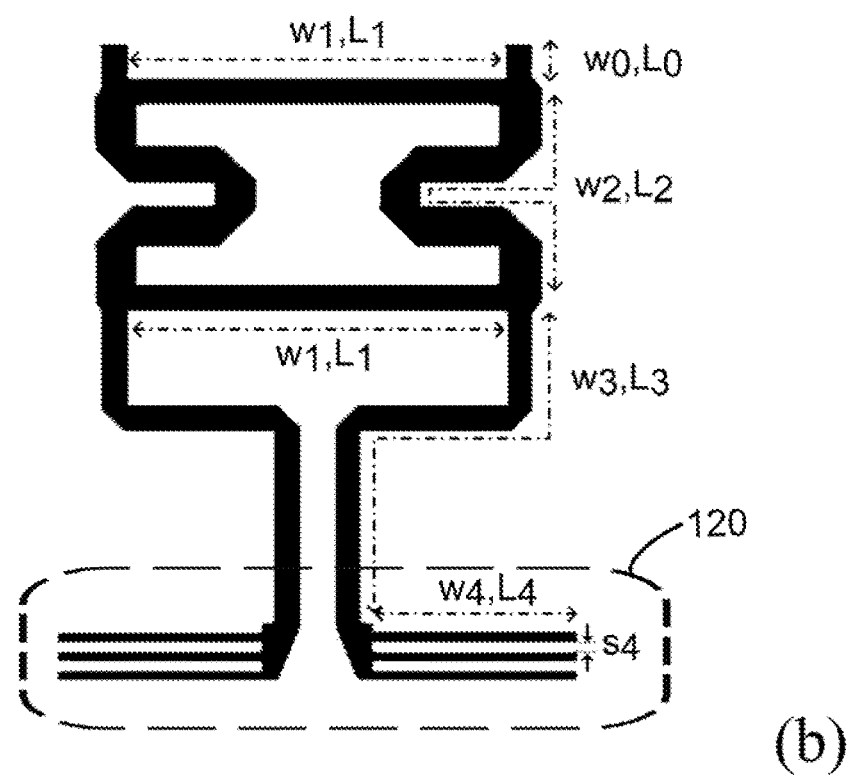
Figure 11:
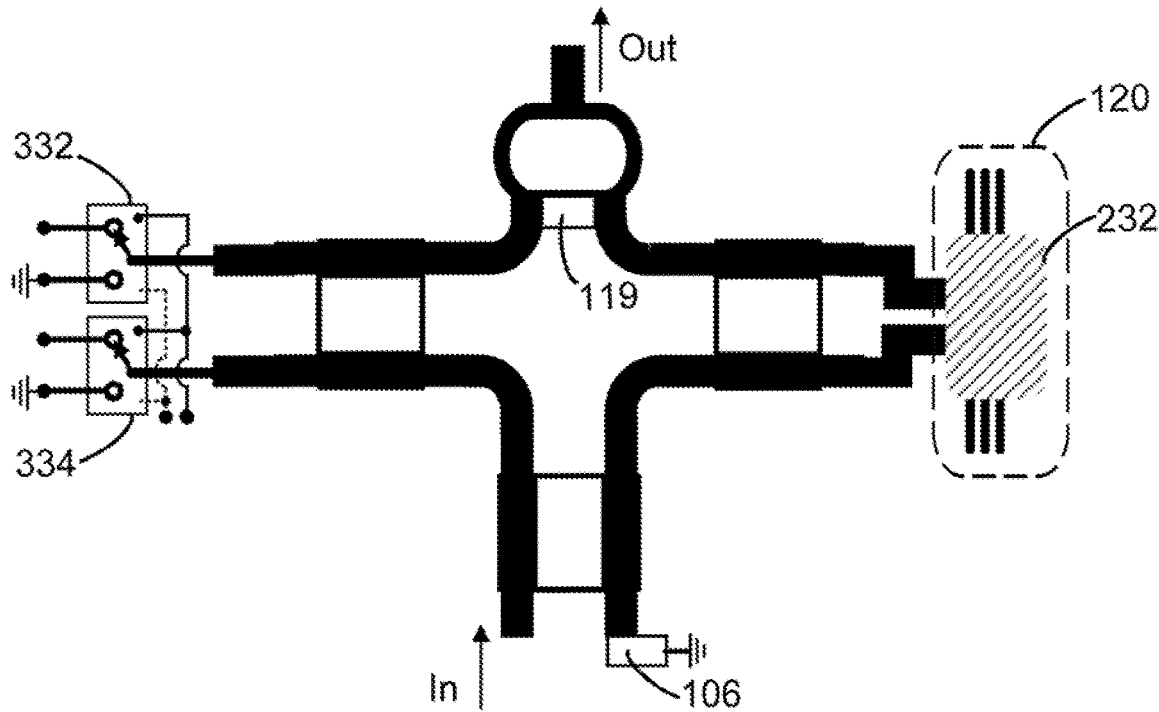
FIG. 11 is a schematic of a fabricated smart low-powered direct-conversion sensor.

FIG. 11 is a schematic of a fabricated smart low-powered direct-conversion sensor, using the same dimensions as in FIG. 9, and in which one sensing circuit has been replaced by the pilot modulator circuit of FIG. 10.

Figure 12:
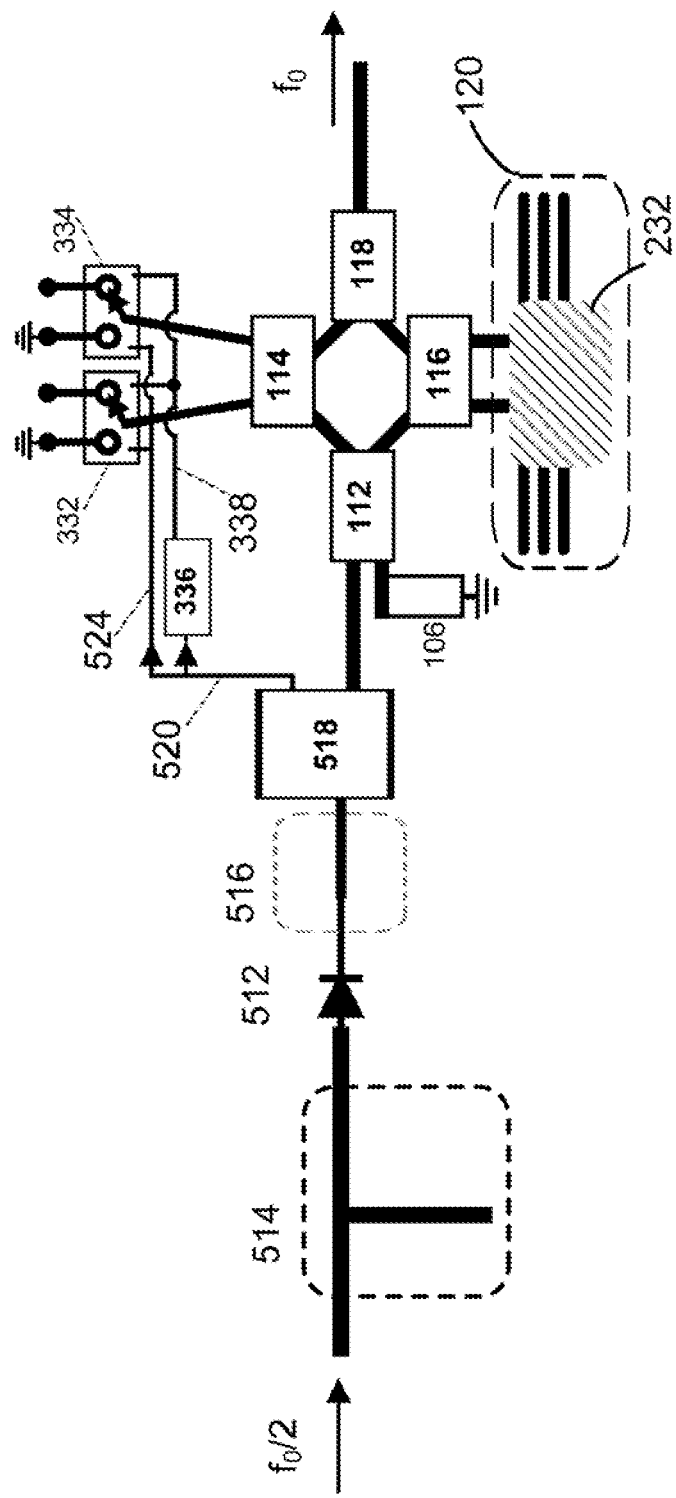
FIG. 12 is a schematic of a fabricated compact smart unpowered wireless/RFID sensor.

A compact smart unpowered direct-conversion sensor was also fabricated, as shown in FIG. 12, to demonstrate the application of the inventive concepts herein to miniature sensor nodes. The six-port structure was used. It can be seen that that by using a low-profile sub-miniature power dividers PD (PD2328J5050S2HF from Anaren™) and hybrid 90° couplers H90 (C2327J5003AHF from Anaren™), the footprint of the sensor structure can be significantly reduced. The selected switches (Infineon™ BGS12SN6) and mid-frequency signal generator (Abracon™ ASTMTXK 32.768KHZ) are also very small. The oscillator used in this example (Abracon™ TCXO 32.768 KHz) is high performance with ultra-low current consumption.

Figure 13:
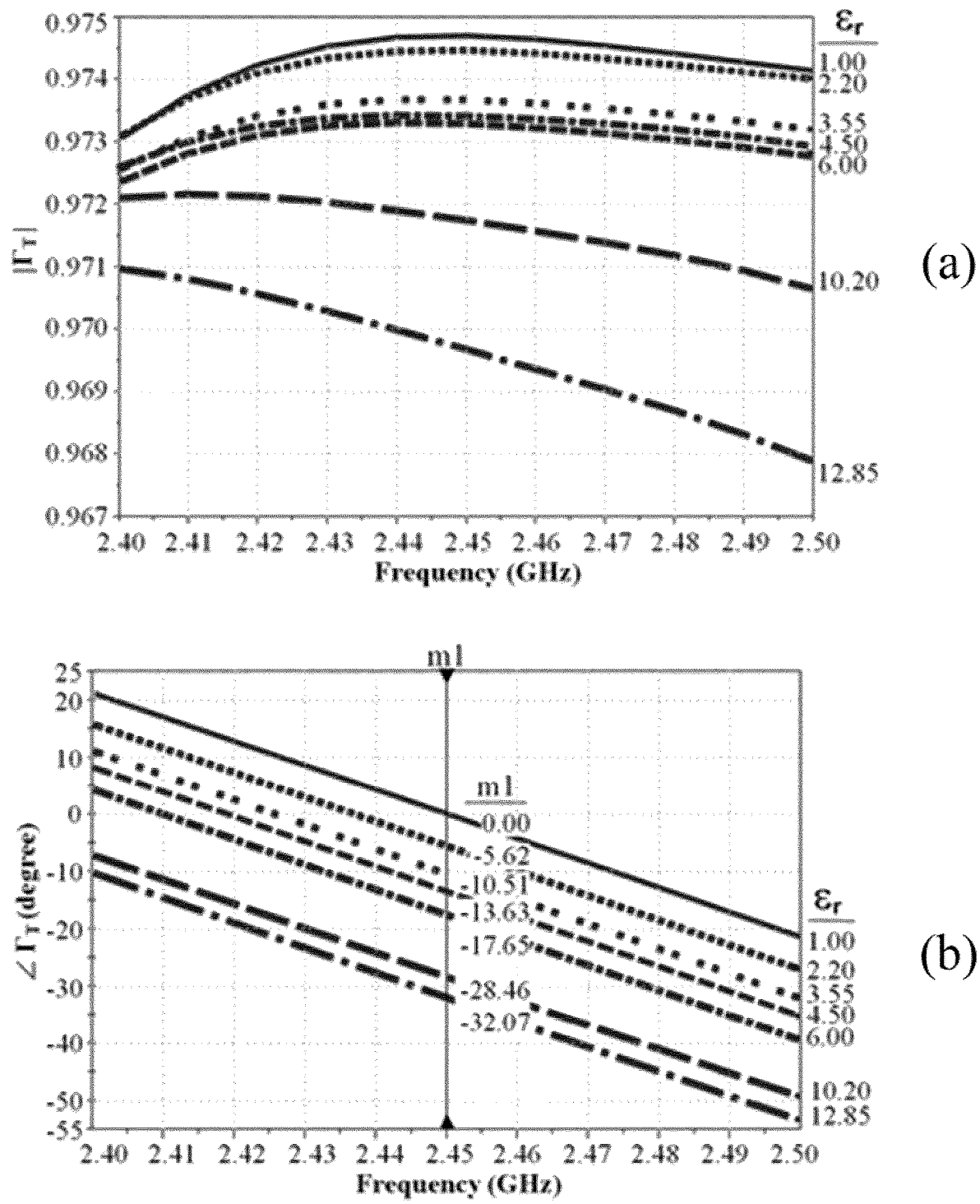
FIGS. 13(a) and (b) are graphs showing the measured amplitude and phase of transmission coefficient, respectively, of a fabricated pilot modulator in a smart low-powered direct-conversion sensor.

FIGS. 13(a) and (b) shows the measured (a) magnitude and (b) phase of the transmission coefficient (ΓT) between ports P2 and P1 of the fabricated smart low-powered direct-conversion sensor, using the six samples mentioned above. As expected for this symmetric structure and its capacitive loads, the magnitude of ΓT in FIG. 13(a) is approximately constant and close to 1.

Figure 14:
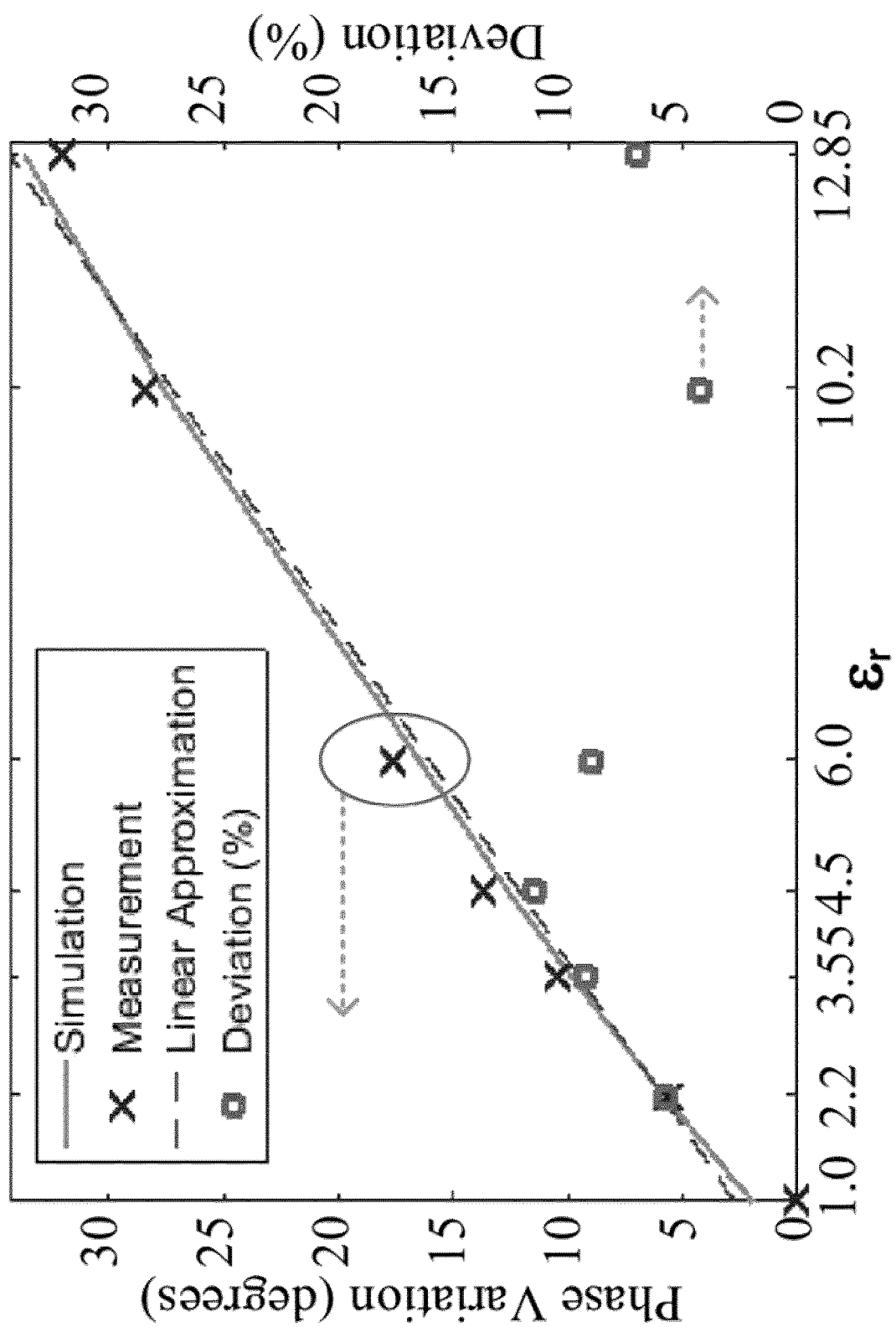
FIG. 14 is a graph depicting the relationship between measured phase variations compared to the free state of the experimental unpowered wireless/RFID sensor.

The variations of phase of $\Gamma_{SUT}$ with respect to the free state of sensor $\Gamma_{Ref}$ (i.e. $\varepsilon_r$=1) is approximately a linear function of $\varepsilon_r$, as can be seen in FIG. 14. This curve can be used at the receiver to find the $\varepsilon_r$ value of SUT from demodulated transmission coefficient and as they are linearly dependent, the calibration procedure is simple.

Figure 15:
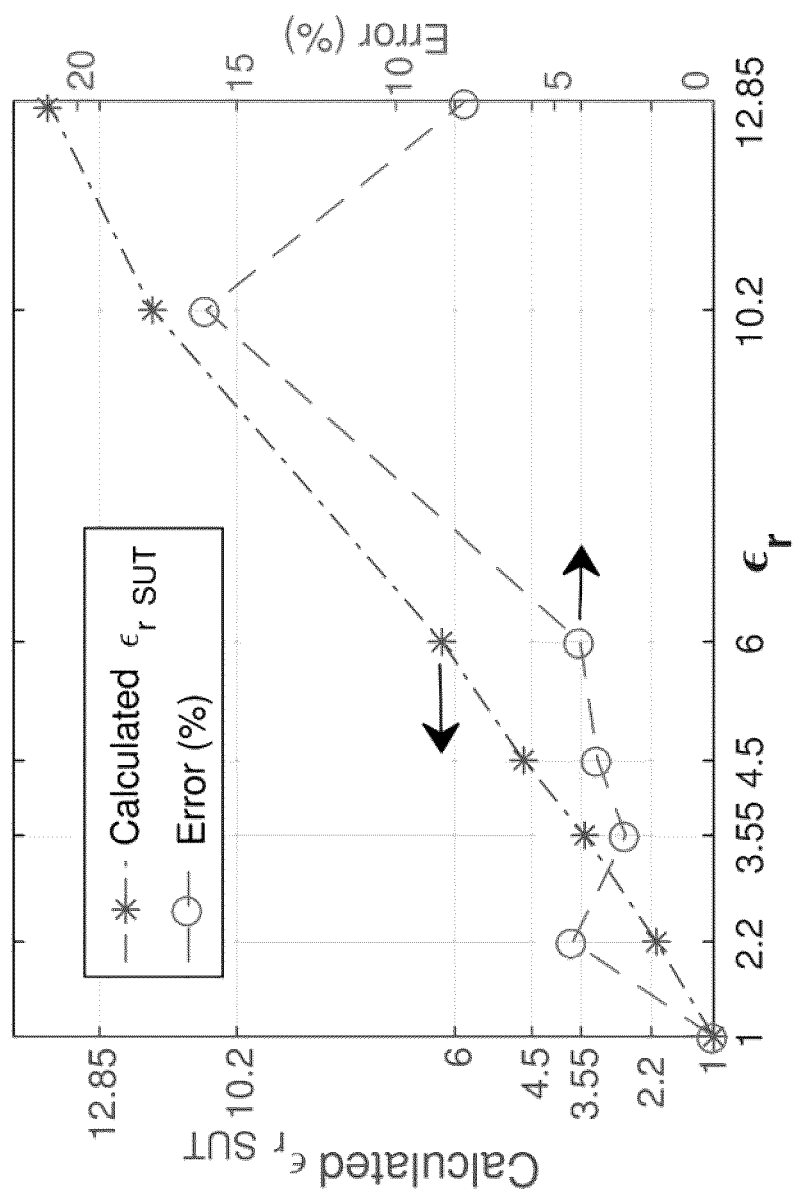
FIG. 15 is a graph showing calculated CrSUT and its error with respect to actual values for the experimental unpowered wireless/RFID sensor node.

FIG. 15 shows the calculated $\varepsilon_{rSUT}$ and its error with respect to the actual value for the fabricated unpowered direct-conversion sensor. In these calculations, the calculated $\Gamma_{SUT}$ was normalized by $\Gamma_{Ref}$ and then mapped into the curve shown in FIG. 14 to find $\varepsilon_r$. As can be seen in FIG. 15, was less than 16%. It should be noted that this error is a function of the transmission channel and may be degraded in a noisy environment.

Figure 16:
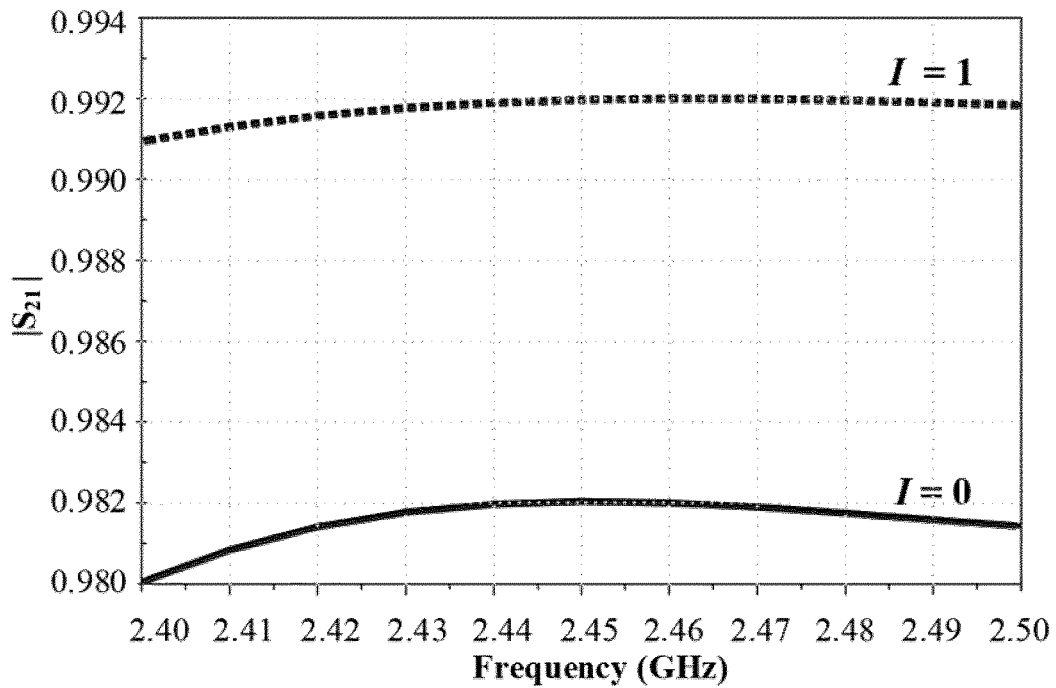
FIGS. 16(a) and (b) are graphs showing the measured amplitude and phase of transmission coefficient, respectively, of a fabricated pilot modulator in a smart unpowered direct-conversion sensor.
Figure 16:
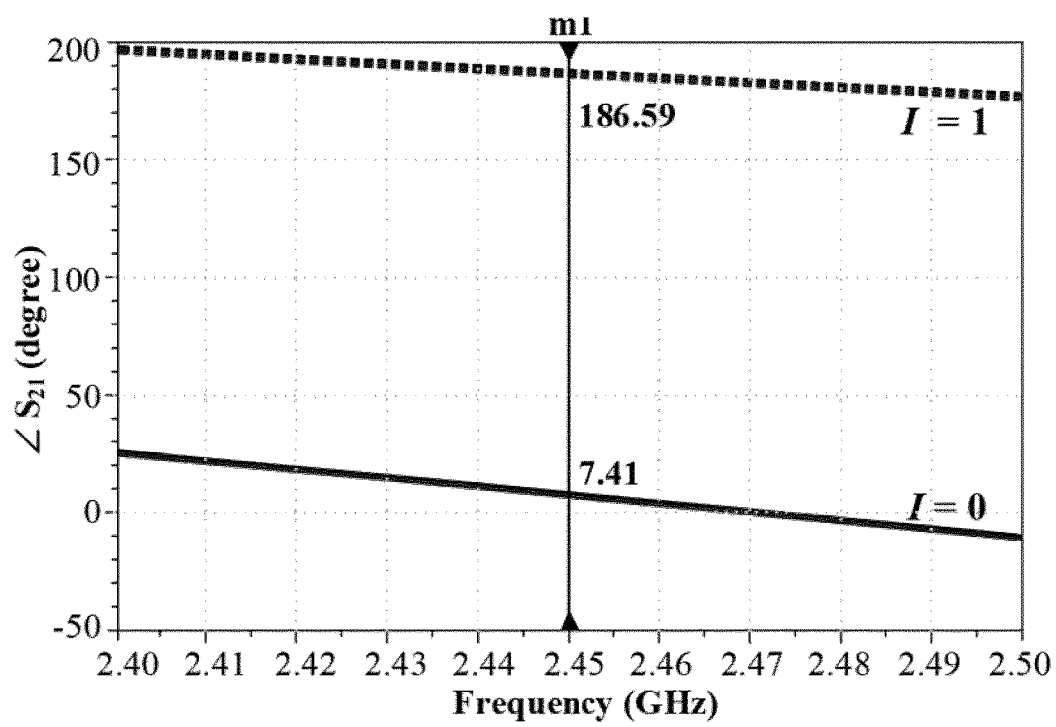

FIGS. 16(a) and (b) show the measured (a) amplitude and (b) phase of transmission coefficient, respectively, of the fabricated pilot modulator in the fabricated smart unpowered direct-conversion sensor. The amplitude of ΓΤ in FIG. 16(a) is approximately constant and close to 1, and the phase difference between two states in FIG. 16(b) is 180°, which reflected design expectations.

Figure 17:
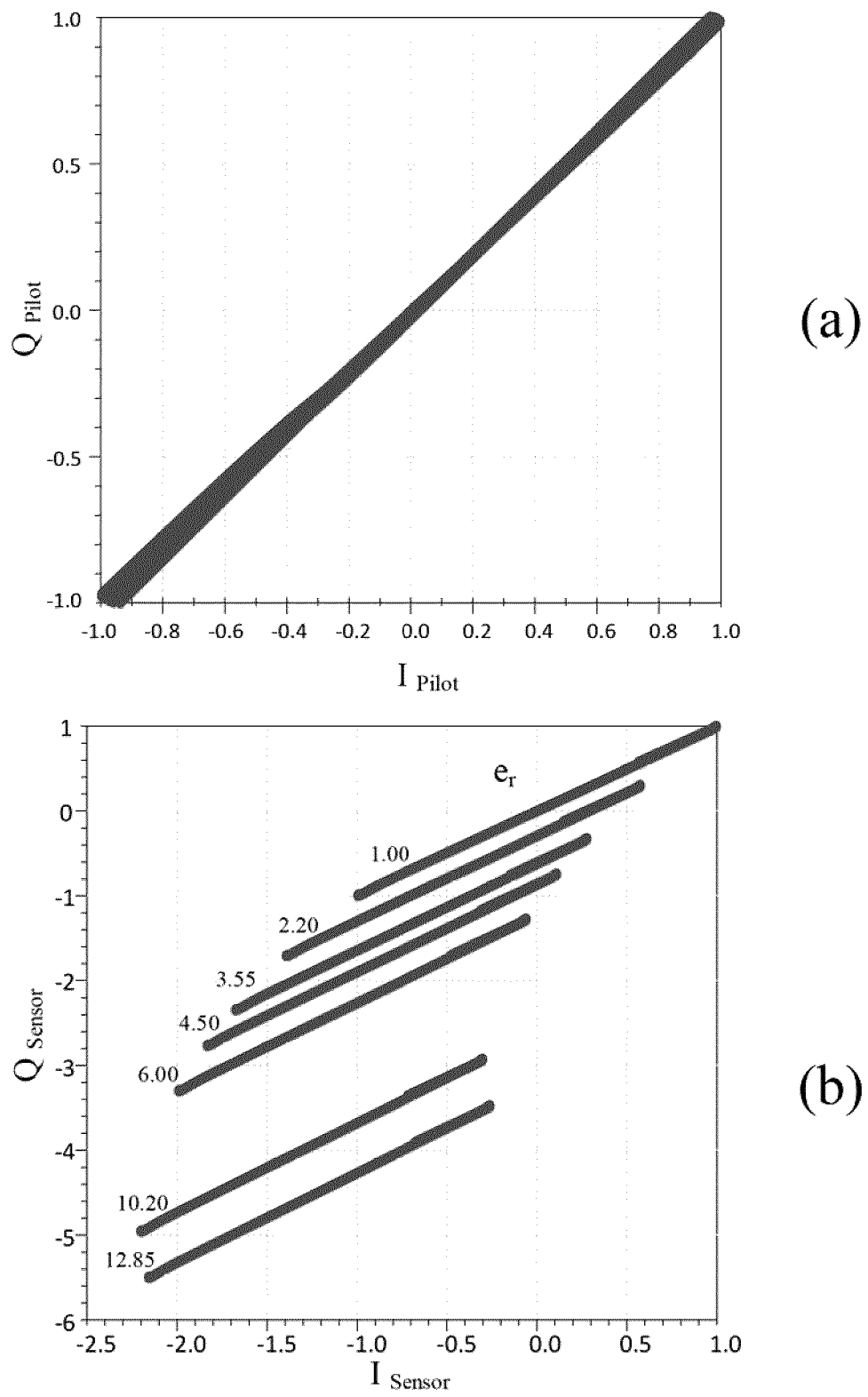
FIGS. 17(a) and (b) are graphs plotting the constellation of demodulated pilot and sensor data, respectively, for the smart low-powered wireless/RFID sensor of FIG. 11.

FIGS. 17(a) and (b) show the constellation (imaginary versus real component of a signal) of the demodulated (a) pilot and (b) sensor data, respectively, for the smart direct-conversion sensor. The constellation of the pilot data was approximately constant while the sensor data varied in proportion to $\varepsilon_r$.

Figure 18:
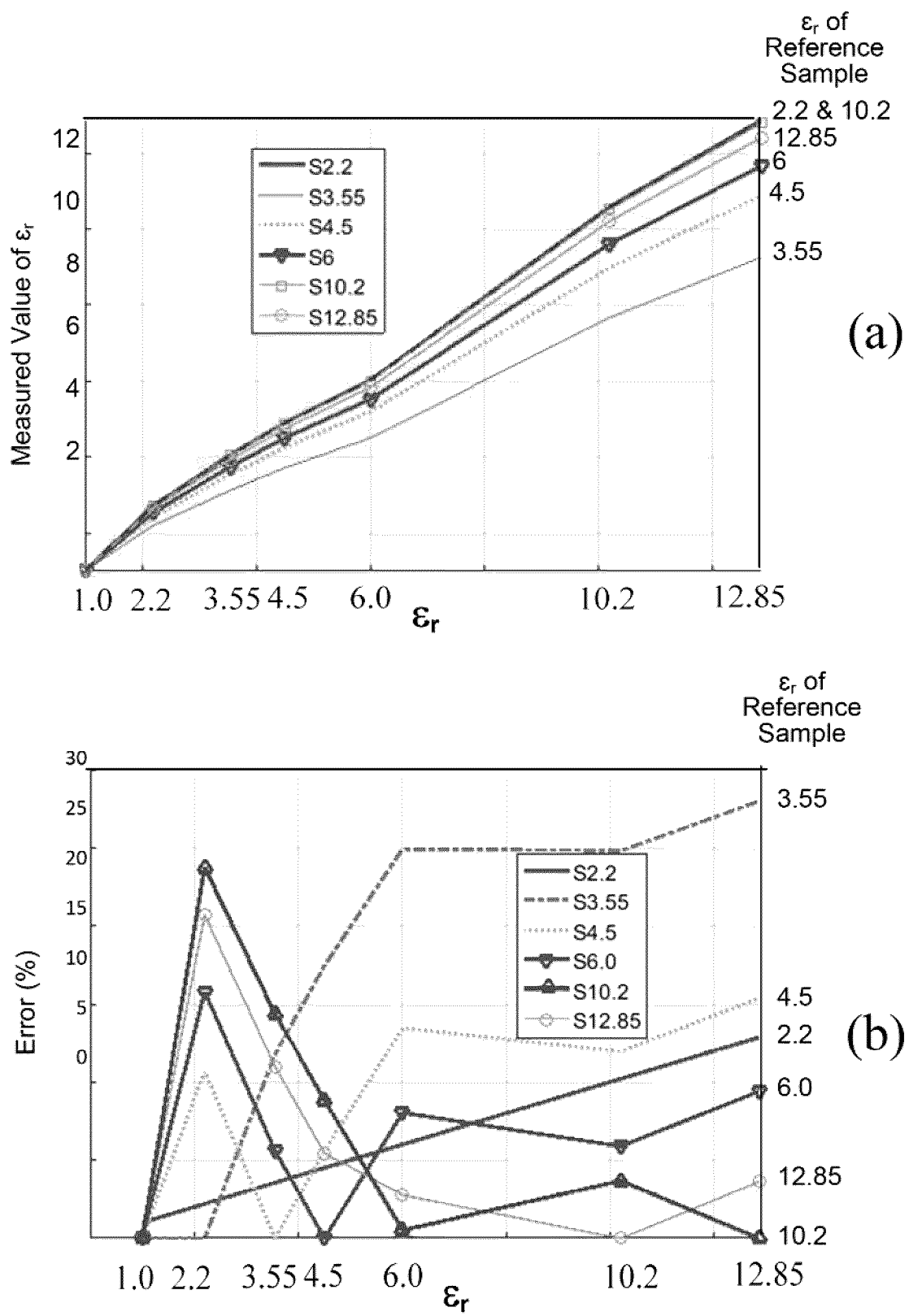
FIGS. 18(a) and (b) are graphs plotting calculated $\varepsilon_r$ from the received signals for different samples for the smart low-powered wireless/RFID sensor of FIG. 11 and the error of calculated $\varepsilon_r$ with respect to the actual value, respectively.

FIGS. 18(a) and (b) show (a) the calculated $\varepsilon_r$ from the received signals for different samples in a calibration process and (b) the error of calculated $\varepsilon_r$ with respect to the actual value for the smart direct-conversion sensor, respectively. In these calculations, the free state and one sample, as indicated in the legends, were used in a linear approximation. Based on the result for the given sample, the other five $\varepsilon_r$ values were calculated based on the extracted $Q_{SUT}/I_{SUT}$ and the above linear approximation. As can be seen in FIG. 18(b), the error related to the $\varepsilon_r$ of the calibration sample. However, based on the desired range of $\varepsilon_r$, a sample can be used as the standard sample to minimize error. In the presented range of $\varepsilon_r$, the error of estimation was kept below 15%. It should be noted that this error is a function of the transmission channel and may be degraded in an industrial or other noisy environment.

It will be appreciated by those skilled in the art that the foregoing embodiments demonstrate a wireless sensor using a modulator, such as a multi-port direct conversion structure, in combination with at least one sensing circuit and either reference or pilot data to modify an input signal to the modulator. The resultant modulated output signal can then be transmitted via an antenna or other suitable means to a receiving unit, such as the aforementioned nodes, which can extract the sensor data from the sensing circuit and the reference/pilot data for analysis and processing. Optionally, the wireless sensor can be powered with an on-board power source; but alternatively, the sensor may obtain or harvest power from another source, or be powered by the signal transmitted by the receiving unit. The receiving unit may be a card reader, smart phone, or other device adapted for communication with the wireless sensor. The wireless sensor, in some embodiments, can thus function as a combined sensor node and RFID tag, and may furthermore operate at a variety of frequencies encompassing radio, telecommunications, and ISM bands. The wireless sensor may furthermore communicate in a wideband or ultra-wideband mode, or in multiple bands, to reduce power consumption or environmental noise. Some or all of the components of the wireless sensor may be provided in compact form, or as integrated circuits.

The present invention has been described above and shown in the drawings by way of example embodiments and applications, having regard to the accompanying drawings. These are merely illustrative of the present invention; it is not necessary for a particular feature of a particular embodiment to be used exclusively with that particular embodiment. Instead, any of the features described above and/or depicted in the drawings can be combined with any of the example embodiments, in addition to or in substitution for any of the other features of those example embodiments. One embodiment's features are not mutually exclusive to another exemplary embodiment's features. Further, it is not necessary for all features of an example embodiment to be used. Instead, any of the features described above can be used, without any other particular feature or features also being used. Accordingly, various changes and modifications can be made to the example embodiments and uses without departing from the scope of the invention as described herein.

The invention claimed is:

1. A wireless sensor, comprising:
   at least one sensing circuit;
   a modulator operably connected to the at least one sensing circuit and configured to modulate an input signal using variations in input impedance produced by the at least one sensing circuit to produce a modulated output signal, wherein the modulator comprises a multi-port direct conversion structure comprising:
   a first coupler providing a first port for receiving the input signal,
   a second coupler providing further ports, the second coupler being connected to a first sensing circuit and configured to modify the input signal using sensor data obtained by the first sensing circuit,
   a third coupler providing further ports, the third coupler being connected to a second sensing circuit and configured to modify the input signal using reference data obtained by the second sensing circuit, and
   a combiner for combining the modified input signals to produce the modulated output signal; and
   a transmitting element operably connected to the modulator to wirelessly transmit the modulated output signal to a receiver.

2. The wireless sensor of claim 1, further comprising a signal generator powered by a power source provided in the wireless sensor to provide the input signal.

3. The wireless sensor of claim 2, wherein the power source comprises a battery, a solar cell, a piezoelectric material, a super-capacitor, or a power-harvesting system.

4. The wireless sensor of claim 1, wherein the input signal is obtained from a wireless signal received by a receiving element of the wireless sensor.

5. The wireless sensor of claim 4, further comprising:
   a receiving element configured to wirelessly receive a signal at a first frequency; and
   a frequency multiplier to multiply the frequency of the received signal to provide the input signal.

6. The wireless sensor of claim 4, wherein the transmitting element comprises a transmitting/receiving element, the wireless sensor further comprising:
   a circulator for redirecting a signal received by the transmitting/receiving element as the input signal to the modulator, and for redirecting the modulated output signal received from the modulator to the transmitting/receiving element to be wirelessly transmitted to the receiver.

7. A wireless sensor, comprising:
   at least one sensing circuit;
   a modulator operably connected to the at least one sensing circuit and configured to modulate an input signal using variations in input impedance produced by the at least one sensing circuit to produce a modulated output signal, wherein the modulator comprises a multi-port direct conversion structure comprising:

a first coupler providing a first port for receiving the input signal, a second coupler providing further ports, the second coupler being connected to a first sensing circuit and configured to modify the input signal using sensor data obtained by the first sensing circuit, a third coupler providing further ports, the third coupler being connected to a pilot sequence generator and configured to modify the input signal using the pilot data generated by the pilot sequence generator, and a combiner for combining the modified input signals to produce the modulated output signal; and a transmitting element operably connected to the modulator to wirelessly transmit the modulated output signal to a receiver.

8. The wireless sensor of claim 7, wherein the pilot sequence generator generates pilot data comprising an identifier.

9. The wireless sensor of claim 8, wherein the identifier is an RFID identifier.

10. The wireless sensor of claim 7, further comprising:
a signal generator to provide the input signal; and
a power source for powering the signal generator and the pilot sequence generator.

11. The wireless sensor of claim 10, wherein the power source comprises a battery, a solar cell, a piezoelectric material, a super-capacitor, or a power-harvesting system.

12. The wireless sensor of claim 7, wherein the input signal is obtained from a wireless signal received by a receiving element of the wireless sensor.

13. The wireless sensor of claim 12, further comprising:
a receiving element configured to wirelessly receive a signal at a first frequency;
a frequency multiplier to multiply the frequency of the received signal;
a DC-RF separator to separate a DC component of the multiplied received signal to power the pilot sequence generator, and an RF component of the multiplied received signal to provide the input signal.

14. The wireless sensor of claim 7, wherein the transmitting element comprises a transmitting/receiving element, the wireless sensor further comprising:
a circulator for redirecting a signal received by the transmitting/receiving element to a divider;
the divider for directing a portion of the received signal to an RF to DC converter to provide power to the pilot sequence generator and a remaining portion of the received signal as the input signal to the modulator;
the circulator also for redirecting the modulated output signal received from the modulator to the transmitting/receiving element to be wirelessly transmitted to the receiver.

15. The wireless sensor of claim 7, wherein the transmitting element comprises a transmitting/receiving element, the wireless sensor further comprising:
a circulator for redirecting a mixed-frequency signal received by the transmitting/receiving element to a diplexer;
the diplexer for directing a portion of the received signal having a first frequency to an RF to DC converter to provide power to the pilot sequence generator and a portion of the received signal having a second frequency as the input signal to the modulator;
the circulator also for redirecting the modulated output signal received from the modulator to the transmitting/receiving element to be wirelessly transmitted to the receiver.

* * * * *